(12) United States Patent
Nakamura et al.

(10) Patent No.: US 8,905,419 B2
(45) Date of Patent: Dec. 9, 2014

(54) REAR STRUCTURE OF SADDLE-RIDE TYPE VEHICLE

(71) Applicant: Honda Motor Co., Ltd., Tokyo (JP)

(72) Inventors: Masanori Nakamura, Wako (JP); Takasumi Yamanaka, Wako (JP); Michio Atsuchi, Wako (JP); Masashi Nagayama, Wako (JP); Kyosuke Inada, Wako (JP); Noriyoshi Sasaki, Wako (JP); Yoshihiro Arai, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/964,334

(22) Filed: Aug. 12, 2013

(65) Prior Publication Data

US 2014/0063825 A1 Mar. 6, 2014

(30) Foreign Application Priority Data

Aug. 28, 2012 (JP) ................................. 2012-187341
Dec. 28, 2012 (JP) ................................. 2012-286623

(51) Int. Cl.
| | |
|---|---|
| B62D 25/16 | (2006.01) |
| B60K 13/02 | (2006.01) |
| B62J 15/00 | (2006.01) |
| B62J 6/04 | (2006.01) |
| B62J 7/04 | (2006.01) |

(52) U.S. Cl.
CPC ................ B60K 13/02 (2013.01); B62D 25/16 (2013.01); B62J 15/00 (2013.01); B62J 6/04 (2013.01); B62J 7/04 (2013.01)
USPC ........................................ 280/219; 296/198

(58) Field of Classification Search
CPC .................................. B62D 25/16; B60K 13/02
USPC ................ 280/152.1; 180/219, 68.3; 286/198
See application file for complete search history.

(56) References Cited

U.S. PATENT DOCUMENTS

| | | | | |
|---|---|---|---|---|
| 7,431,114 | B2* | 10/2008 | Ohira et al. ................... | 180/68.3 |
| 7,766,355 | B2* | 8/2010 | Ichihara ..................... | 280/152.3 |
| 8,459,393 | B2* | 6/2013 | Yamamoto ..................... | 180/219 |
| 2004/0231899 | A1* | 11/2004 | Michisaka et al. ............. | 180/68.1 |
| 2005/0145427 | A1* | 7/2005 | Sugitani et al. ............... | 180/68.3 |
| 2006/0000652 | A1* | 1/2006 | Yamaguchi et al. ........ | 180/68.3 |
| 2013/0240276 | A1* | 9/2013 | Matsushima et al. ........ | 180/68.3 |

FOREIGN PATENT DOCUMENTS

JP  2002-029475 A  1/2002

* cited by examiner

*Primary Examiner* — Tony Winner
(74) *Attorney, Agent, or Firm* — Birch, Stewart, Kolasch & Birch, LLP

(57) ABSTRACT

A rear structure of a saddle-ride type vehicle for preventing rainwater or the like splashed by a rear wheel from entering a fresh air inlet of an engine intake system. The rear structure of a saddle-ride type vehicle includes a rear fender halved into a first fender and a second fender connected to each other. The first fender is formed with a hanging portion so as to cover the rear and upside of a rear wheel and the second fender covering the upside of the rear wheel with a fresh air inlet being provided lateral to and in front of the rear wheel. The first fender and the second fender are disposed to overlap each other in an anteroposterior direction. The second fender is disposed on the vehicle-widthwise inside of the first fender. The second fender has anteroposteriorly and downwardly extending sidewalls at both vehicle-widthwise lateral end portions.

20 Claims, 18 Drawing Sheets

REAR STRUCTURE OF SADDLE-RIDE TYPE VEHICLE

CROSS-REFERENCE TO RELATED APPLICATIONS

The present application claims priority under 35 USC 119 to Japanese Patent Application No. 2012-187341 filed Aug. 28, 2012 and Japanese Patent Application No. 2012-286623 filed Dec. 28, 2012 the entire contents of which are hereby incorporated by reference.

BACKGROUND OF THE INVENTION

1. Field of the Invention

The present invention relates to a rear structure of a saddle-ride type vehicle for preventing rainwater or the like splashed by a rear wheel from entering an engine intake system.

2. Description of Background Art

A saddle-ride type vehicle includes a rear fender covering the upside and rearwardly side of a rear wheel. The rear fender has a structure divided into a fender plate secured to a lower portion of a storage box and a mudguard secured to a rear end portion of the fender plate and extending rearwardly and downwardly. See, for example, Japanese Patent Laid-Open No. 2002-29475.

In the conventional technology described above, the rearwardly and downwardly extending mudguard has a complicated shape. Therefore, the rear fender has a divided structure. However, a vehicle having a fresh air inlet of an engine intake system at a position close to the rear wheel needs a rear fender structure for preventing rainwater or the like splashed by the rear wheel from entering the fresh air inlet.

SUMMARY AND OBJECTS OF THE INVENTION

The present invention has been made in view of such situations and aims to provide a rear structure of a saddle-ride type vehicle for preventing rainwater or the like splashed by a rear wheel from entering a fresh air inlet of an engine intake system.

To solve the above problem, an embodiment of the present invention includes a rear structure of a saddle-ride type vehicle having a rear fender (66) halved into a first fender (66A) and a second fender (66B) connected to each other. The first fender (66A) is formed with a hanging portion (66d) so as to cover the rearward and upside of a rear wheel (3). The second fender (66B) is formed covering the upside of the rear wheel (3). A fresh air inlet (35a) is provided lateral to and in front of the rear wheel (3) with the first fender (66A) and the second fender (66B) being disposed to overlap each other in an anteroposterior direction. The second fender (66B) is disposed on the vehicle-widthwise inside of the first fender (66A). The second fender (66B) has anteroposteriorly and downwardly extending sidewalls (66u) at both vehicle-widthwise lateral end portions.

According to an embodiment of the present invention, even in the structure provided with the fresh air inlet lateral to and in front of the rear wheel, rainwater or the like splashed from the rear wheel can be collected in the vehicle-widthwise central portion of the rear fender by sidewalls of the second fender and prevented from entering the fresh air inlet disposed laterally.

In the above configuration, a vehicle-widthwise and forwardly extending rib wall (66m) may be installed on an opposite surface of the first fender (66A) to the rear wheel (3) at a position below the second fender (66B). According to this configuration, the amount of the rainwater or the like splashed from the rear wheel and led to between the sidewalls of the second fender can be suppressed by the rib wall, whereby the rainwater or the like entering the fresh air inlet can further be prevented.

According to an embodiment of the present invention, a cross member (21) connecting a pair of left and right seat rails (14, 14) together may be provided and the second fender (66B) may be secured to the cross member (21). According to this configuration, the second fender is secured to the cross member. Thus, the second fender can be secured without being enlarged in the vehicle-width direction, thereby achieving weight saving.

In addition, a lamp (271) may be installed on a rear surface of the first fender (66A) at a position in the rear of the second fender (66B). Further, a harness (281) connected to the lamp (271) may be disposed between the first fender (66A) and the second fender (66B). According to this configuration, the harness can be guided by the second fender and rainwater or the like can be prevented from covering the inside of the lamp and the harness.

According to an embodiment of the present invention, a luggage box (44) may be disposed in front of the second fender (66B) and may have a bottom wall lower surface located to face the rear wheel (3). A given gap (277) may be provided between a front end of the second fender (66B) and a bottom wall rear end of the luggage box (44). According to this configuration, the provision of the given gap can prevent the movement of liquid such as rainwater running along the second fender from the rear to the front.

In addition, a shield wall (265, 301) may be installed on a side where the fresh air inlet (35a) is disposed in a vehicle-width direction, and between the second fender (66B) and the fresh air inlet (35a) in the anteroposterior direction. According to this configuration, even if rainwater or the like is splashed toward the outside of the sidewall of the second fender, the rainwater or the like can be prevented from entering the fresh air inlet by the shield wall.

The shield wall (265, 301) may be formed with a slit (265d, 301d). According to this configuration, the slit is formed; therefore, rainwater or the like adhering to the rear surface of the shield wall can be splashed rearwardly by air flow resulting from the operation of the vehicle.

The shield wall (301) may be provided with a plurality of longitudinal ribs (301e). According to this configuration, because of the provision of the longitudinal ribs, water splashed from the rear wheel is not scattered in a specified direction. In addition, the rigidity of the shield wall can be improved.

According to an embodiment of the present invention, the fresh air inlet is provided lateral to and in front of the rear wheel with the first fender and the second fender being disposed to overlap each other in the anteroposterior direction. The second fender is disposed on the vehicle-widthwise inside of the first fender with the second fender having the anteroposteriorly and downwardly extending sidewalls at both vehicle-widthwise lateral end portions. Therefore, even in the structure provided with the fresh air inlet lateral to and in front of the rear wheel, rainwater or the like splashed from the rear wheel can be collected in the vehicle-widthwise central portion of the rear fender by the sidewalls of the second fender and can be prevented from entering the fresh air inlet disposed laterally.

The vehicle-widthwise and forward extending rib wall is installed on the opposite surface of the first fender to the rear wheel at a position below the second fender. Therefore, the amount of the rainwater or the like splashed from the rear wheel and led to between the sidewalls of the second fender can be suppressed by the rib wall. Thus, the rainwater or the like can further be prevented from entering the fresh air inlet.

The cross member connecting the pair of left and right seat rails together is provided and the second fender is secured to the cross member. Therefore, the second fender can be secured without being enlarged in the vehicle-width direction. Thus, a weight saving can be achieved.

The lamp is installed on the rear surface of the first fender at a position in the rear of the second fender. In addition, the harness connected to the lamp is disposed between the first fender and the second fender. Therefore, the harness can be guided by the second fender and rainwater or the like can be prevented from covering the inside of the lamp and the harness.

The luggage box is disposed in front of the second fender and has the bottom wall lower surface located to face the rear wheel. In addition, the given gap is provided between the front end of the second fender and the bottom wall rear end of the luggage box. Therefore, it is possible to prevent the movement of liquid such as rainwater running along the second fender from moving from the rear to the front.

The shield wall is installed on the side where the fresh air inlet is disposed in the vehicle-width direction, and between the second fender and the fresh air inlet in the anteroposterior direction. Therefore, even if rainwater or the like is splashed toward the outside of the sidewall of the second fender, the rainwater or the like can be prevented from entering the fresh air inlet by the shield wall.

Since the shield wall is formed with the slit, the rainwater or the like adhering to the rear surface of the shield wall can be scattered rearwardly by an air flow resulting from the movement of the vehicle.

The shield wall is provided with the plurality of longitudinal ribs; therefore, the water splashed from the rear wheel is not scattered in a specified direction. In addition, the rigidity of the shield wall can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment of the present invention will hereinafter be described with reference to the drawings. In addition, directions such as front, back or rear, left, right, upside and downside are described in the same way as those with respect to a vehicle body unless otherwise described in the explanation. Symbol FR shown in the figures denotes the front of the vehicle body, UP denotes the upside of the vehicle body, and LE denotes the left of the vehicle body.

Figure 1:
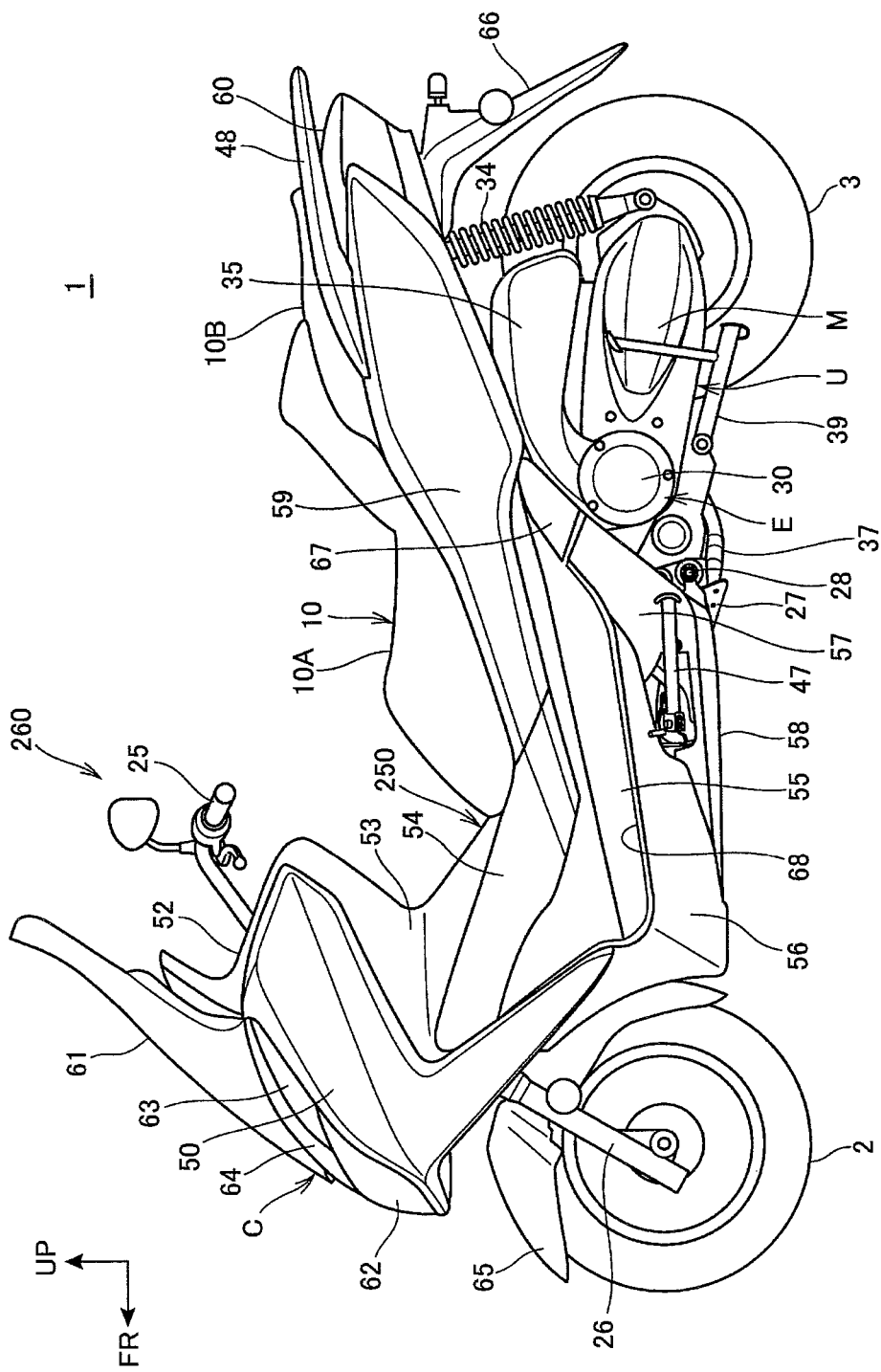
FIG. 1 is a left lateral view of a motorcycle (a saddle-ride type vehicle) according to a first embodiment of the present invention.

FIG. 1 is a left lateral view of a motorcycle (saddle-ride type vehicle) 1 according to the first embodiment of the present invention.

The motorcycle 1 is a scooter-type vehicle having a pair of left and right low step floors 68, 68 for positioning the feet of an occupant sitting on a seat 10. The motorcycle 1 has a front wheel 2 in front of a body frame F (see FIG. 2). A rear wheel 3 or a drive wheel is pivotally supported by a unit swing engine U (a unit swing power unit) disposed in a rear portion of the vehicle. The body frame F is covered by a body cover C made of resin.

Figure 2:
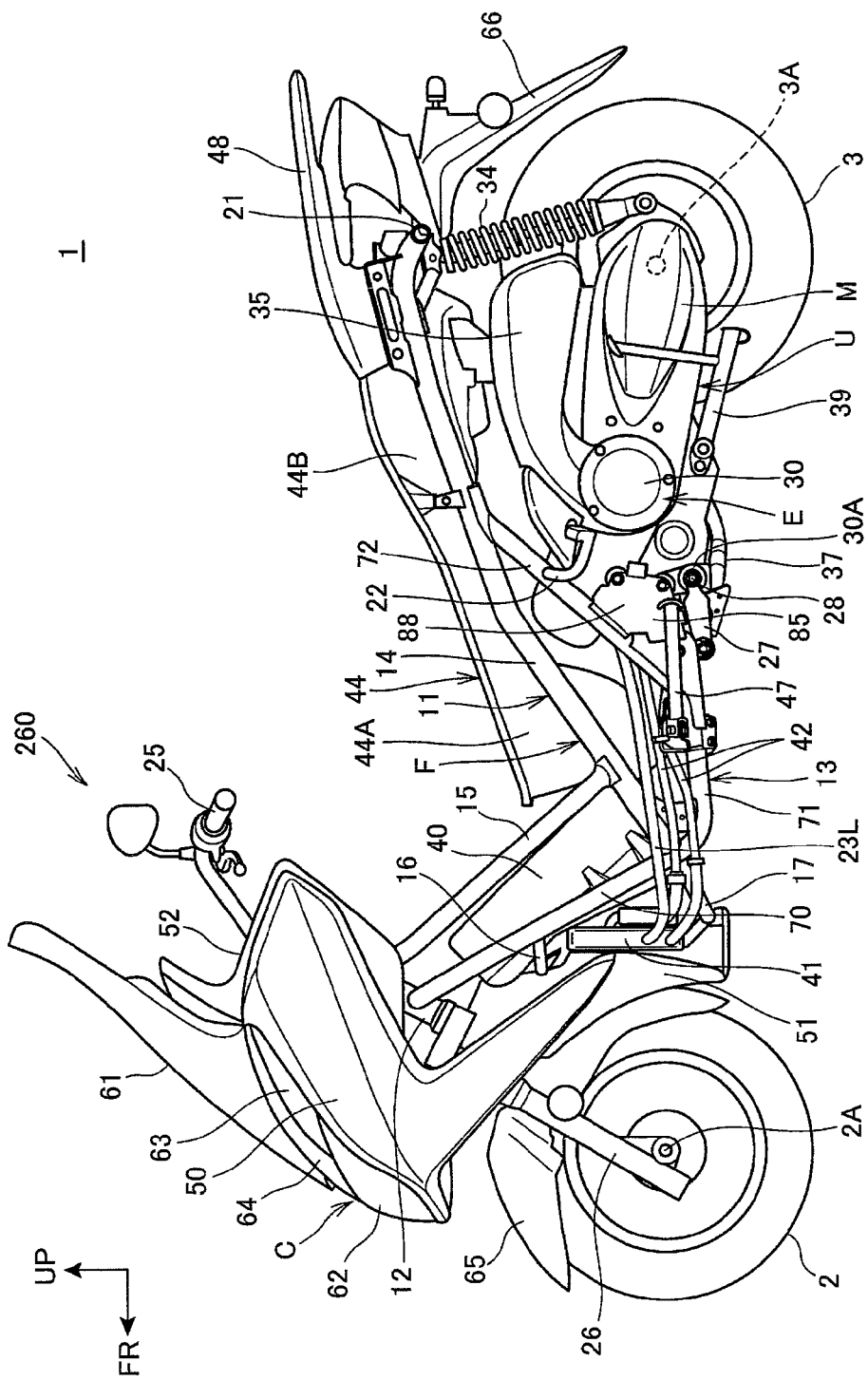
FIG. 2 is a left lateral view illustrating an interior structure of the motorcycle.
Figure 3:
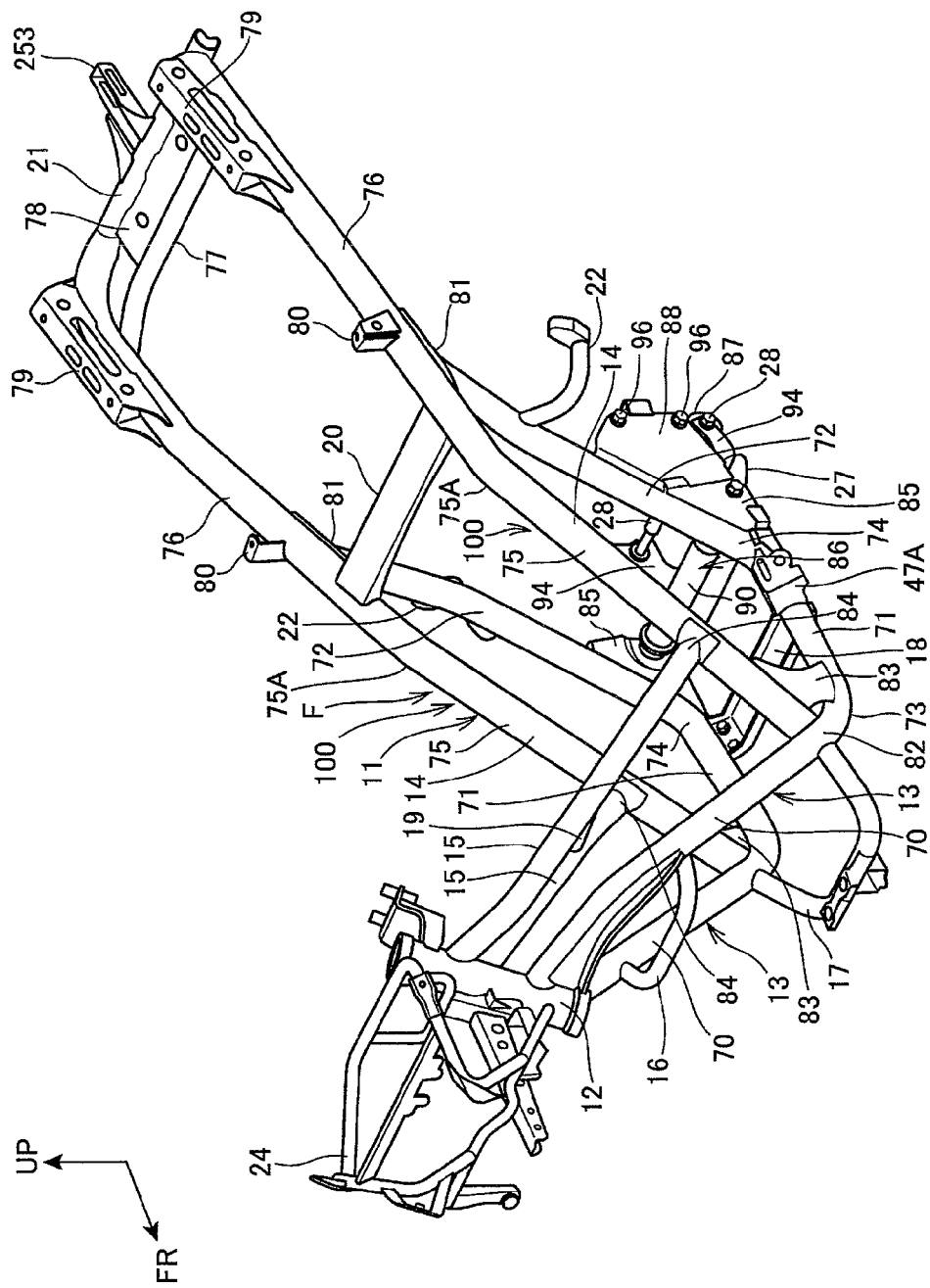
FIG. 3 is a perspective view of a body frame.
Figure 4:
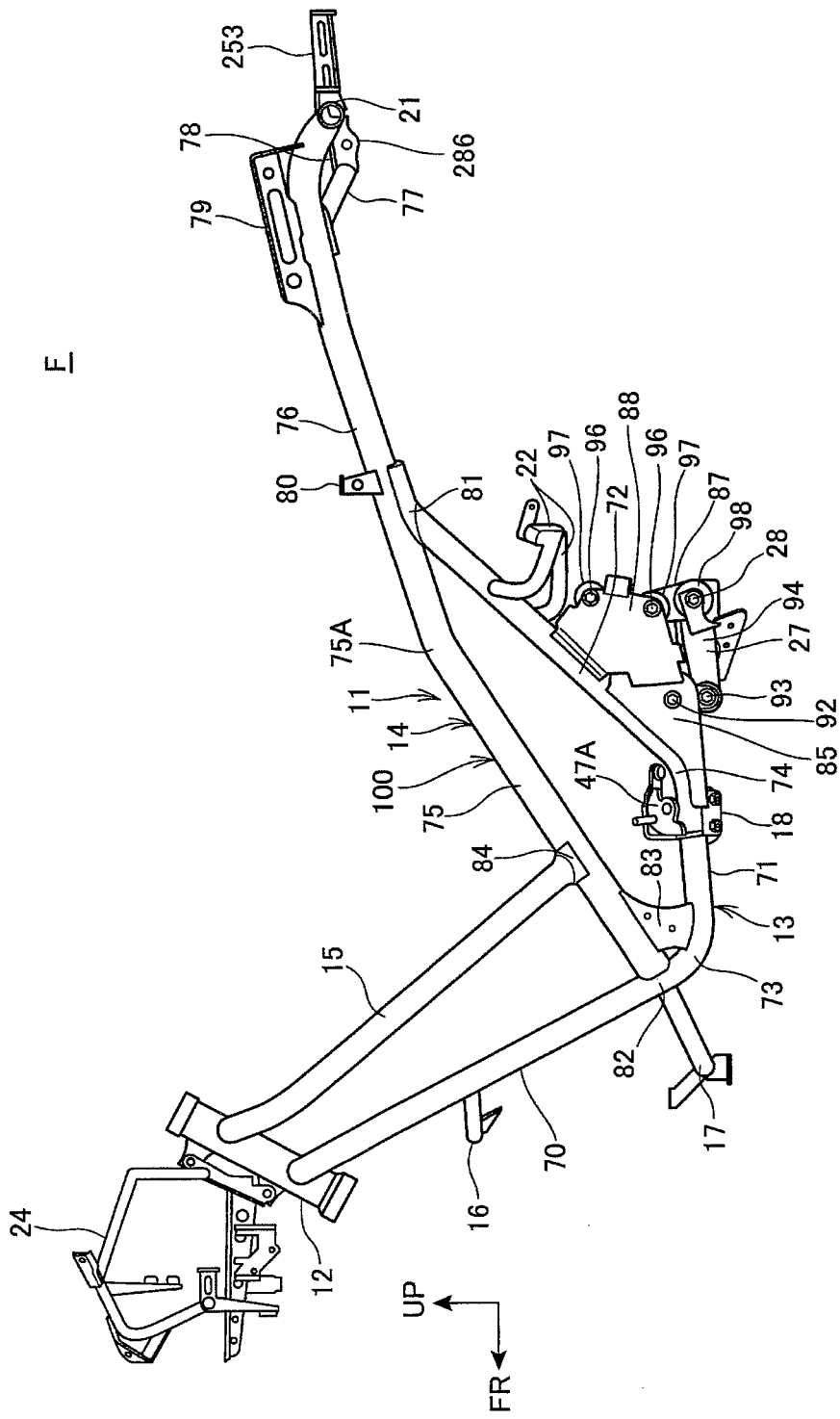
FIG. 4 is a lateral view of the body frame.

FIG. 2 is a left lateral view illustrating an interior structure of the motorcycle 1. FIG. 3 is a perspective view of the body frame F. FIG. 4 is a lateral view of the body frame F. In addition, FIG. 2 illustrates a state in which the body cover C is partially removed.

As shown in FIGS. 2 and 3, the body frame F is formed by connecting together a plurality of metal tubes and pipes by welding. A main frame 11 includes a head pipe 12 installed in a front portion; a pair of left and right down tubes 13, 13 extending rearwardly and downwardly from the head pipe 12, then extending rearwardly in a roughly horizontal manner, and extending rearwardly and upward in a rear portion. A pair of left and right seat rails 14, 14 extend rearwardly and upward from corresponding lower portions of the down tubes 13, 13 to the rear portion of the vehicle with a pair of left and right upper tubes 15, 15 extending rearwardly and downwardly at a position above the corresponding down tubes 13, 13 from the head pipe 12 and joined to the corresponding seat rails 14, 14.

Each of the down tubes 13, 13 includes a downwardly extending portion 70 joined at its front end to the head pipe 12 and extending rearwardly and downwardly with a horizontal extending portion 71 extending rearwardly in a roughly horizontal manner from the lower end of the downwardly extending portion 70. An obliquely upward extending portion 72 extends rearwardly and upward from the rear end of the horizontal extending portion 71.

As shown in FIG. 3, the main frame 11 includes, as cross members connecting the left and right frames together, a front upper portion cross member 16 connecting together upper portions of the downwardly extending portions 70, 70 of the down tubes 13, 13 with a front cross member 17 connecting together lower portions of the downwardly extending portions 70, 70. A horizontal portion cross member 18 connects together the horizontal extending portions 71, 71 of the down tubes 13, 13. An upper portion cross member 19 connects together the upper tubes 15, 15 with an intermediate cross member 20 connecting together the seat rails 14, 14. A rear portion cross member 21 connects together rear portions of the seat rails 14, 14. The horizontal portion cross member 18 is bolted to the horizontal extending portions 71, 71.

A pair of left and right tandem step stays 22, 22 extending outward in a vehicle-width direction are installed on corresponding upper portions of the obliquely upward extending portions 72, 72 of the down tubes 13, 13.

A basket-like front portion frame 24 supporting lights, the body cover C and the like is connected to a front surface of the head pipe 12.

Further, a pair of left and right step frames 23L and 23R (only reference symbol 23L is shown in FIG. 2) are installed on the lateral side of the main frame 11. The step frames 23L and 23R are connected to the respective down tubes 13, 13, extend forward and rearwardly, and support the corresponding step floors 68, 68 from below.

As shown in FIG. 1 and FIG. 2, a steering system 260 for steering the front wheel 2 has a steering shaft (not shown) turnably supported by the head pipe 12 and a handlebar 25 joined to an upper portion of the steering shaft. The steering shaft has a lower end joined to a pair of left and right front forks 26, 26. The front wheel 2 is pivotally supported by lower ends of the front forks 26, 26 via an axle 2A and is steered by being operated by the handlebar 25.

The unit swing engine U is of a unit swing type in which an engine E and a transmission case M housing a belt-type continuously variable transmission (not shown) are integrated. In addition, the unit swing engine U has also a function as a swig arm supporting the rear wheel 3. The unit swing engine U is connected to rear portions of the down tubes 13, 13 via corresponding link members 27, 27 joined to front portion of the unit swing engine U. The unit swing engine U is vertically swingable around a pivot shaft 28 installed in the link members 27, 27.

The engine E is a water-cooled four-cycle single-cylinder engine and is arranged such that a cylinder axis extends forward in a roughly horizontal manner. The engine E is configured by joining a cylinder (not shown) and a cylinder head (not shown) to a front surface of a crankcase 30 disposed in a front portion of the unit swing engine U (the unit swing power unit).

The transmission case M extends rearwardly from a rear portion of the crankcase 30 by way of the left side of the rear wheel 3. An arm portion extending rearwardly by way of the right side of the rear wheel 3 is installed in the rear portion of the crankcase 30. The rear wheel 3 is supported by an axle 3A installed between a rear portion of the transmission case M and a rear portion of the arm portion. The output of the engine E is transmitted to the rear wheel 3 via the above continuously variable transmission.

A pair of left and right rear suspensions 34, 34 (only reference numeral 34 on the front side is shown in the figure) are spanned between the rear end of the transmission case M and the rear end of the arm portion, and the corresponding seat rails 14, 14.

An air cleaner box 35 adapted to suck fresh air is installed on an upper surface of the transmission case M.

The air cleaner box 35 constitutes part of an intake system of the engine E and is connected via a connecting tube 262 (see FIG. 5) to a throttle body connected to an intake port on an upper surface of the cylinder head.

An exhaust pipe 37 coupled to an exhaust port of a lower surface of the cylinder head extends rearwardly while passing below the engine E and is coupled to a muffler 38 (see FIG. 13) secured to an outside surface of the arm portion. A main stand 39 capable of supporting the vehicle in an upright state is installed on a lower part of the rear portion of the transmission case M.

A fuel tank 40 for storing fuel for the engine E is formed such that a front surface extends along the downwardly extending portion 70 of the down tube 13 and a rear surface extends along the upper tube 15 as viewed from the side. As regards the vertical direction, the fuel tank 40 extends vertically lengthwise from the rear of a lower portion of the head pipe 12 to the vicinity of the horizontal extending portion 71 of the down tube 13. The fuel tank 40 is disposed between the left and right down tubes 13, 13 so as to be tilted forward.

A plate-like radiator 41 for cooling the cooling water of the engine E is installed in space below a front portion of the forward tilted fuel tank 40. A pair of cooling water pipes 42, 42 connecting the radiator 41 with the engine E extends from a left side portion of the radiator 41, extends rearwardly at a position below the step frame 23L on the left (one side) of the vehicle, passes the inside of the down tubes 13 and connects with the engine E. A side stand 47 is attached to the left horizontal extending portion 71.

A luggage box 44 for storing articles is disposed between the seat rails 14, 14 and extends rearwardly and upward along the seat rails 14, 14 from the vicinity of a rear portion of the fuel tank 40 up to above the transmission case M. The luggage box 44 is such that a front storing portion 44A and a rear storing portion 44B are integrally formed by resin molding. The front storing portion 44A is disposed between the fuel tank 40 and the obliquely upward extending portions 72, 72 of the down tubes 13, 13. The rear storing portion 44B is disposed above the unit swing engine U.

The luggage box 44 has an upper surface opening along the full length thereof. This opening is closed by the occupant seat 10 (see FIG. 1) in an openable and closable manner. The seat 10 has a front seat 10A on which an operator sits and a rear seat 10B which is formed higher by one step than the front seat 10A and on which a pillion passenger sits.

A grab rail 48 is secured to the rear portions of the seat rails 14, 14 at a position rearwardly of the luggage box 44.

As shown in FIG. 1 and FIG. 3, the body cover C includes a front cover 50, a front lower cover 51 (see FIG. 2), an upper cover 52, an upper inner cover 53, a pair of left and right lower inner covers 54, 54 (only reference numeral 54 on the front side is shown in the figure), a pair of left and right step covers 55, 55 (only reference numeral 55 on the front side is shown), a pair of left and right front floor skirts 56, 56 (only reference numeral 56 on the front side is shown), a pair of left and right rear floor skirts 57, 57 (only reference numeral 57 on the front side is shown), an under cover 58, a pair of left and right body side covers 59, 59 (only reference numeral 59 on the front side is shown), and a tail cover 60. The front cover 50 covers the front and left and right sides of the head pipe 12, and extends downwardly at a position in front of the downwardly extending portions 70, 70. The front lower cover 51 is joined to a lower portion of the front cover 50 and located behind the front wheel 2. The upper cover 52 is joined to an upper portion of the front cover 50 at a position below the handlebar 25. The upper inner cover 53 is joined to left and right edge portions of the front cover 50 and covers the head pipe 12, the upper tubes 15, 15 and the downwardly extending portions 70, 70 from the rear and the side. The lower inner covers 54, 54 are joined to the lower edge of the upper inner cover 53 and cover the upper tubes 15, 15 and the downwardly extending portions 70, 70. The step covers 55, 55 are joined to the lower portion of the front cover 50 and the lower edges of the lower inner covers 54, 54 and cover the left and right step frames 23L and 23R (only reference symbol 23L is shown in FIG. 2) from above. The front floor skirts 56, 56 are joined to the lower portion of the front cover 50 and lower portions of the step covers 55, 55 and cover the step frames 23L and 23R from the side. The rear floor skirts 57, 57 continue with the respective front floor skirts 56, 56, extend rearwardly, and cover the down tubes 13, 13. The under cover 58 covers the left and right horizontal extending portions 71, 71 from below. The body side covers 59, 59 are joined to rear portions of the lower inner covers 54, 54 and of the step covers 55, 55 and cover the luggage box 44 and the seat rails 14, 14 from the side at positions below the seat 10. The tail cover 60 is joined to rear portions of the body side covers 59, 59.

The pair of left and right step floors 68, 68 (only reference numeral 68 on the front side is shown) on which the feet of the operator sitting on the front seat 10A are put is formed on the corresponding bottom portions of the left and right step covers 55, 55.

The above-mentioned upper inner cover 53, lower inner covers 54, 54 and step covers 55, 55 are component parts forming a center tunnel 250 disposed on the lower side between the handlebar 25 and the seat 10.

A windscreen 61 extending rearwardly and upward is installed in a front portion of the front cover 50. A headlight 62 is installed at the front end of the front cover 50. A pair of left and right direction indicators 63, 63 is installed continuously with upper portions of the headlight 62. A plate-like garnish 64 is installed between the headlight 62 and the windscreen 61.

A front fender 65 covering the front wheel 2 from above is mounted to the front forks 26, 26. A rear fender 66 covering the rear wheel 3 from above is mounted below the body side covers 59, 59.

A pair of retractable tandem steps 67, 67 (see FIG. 1) on which the feet of the pillion passenger sitting on the rear seat 10B are put is supported by the corresponding tandem step stays 22, 22.

A frame structure of the motorcycle 1 is hereinafter described in detail.

As shown in FIGS. 3 and 4, each of the down tubes 13, 13 includes the downwardly extending portion 70 having a front end joined to the lower portion of the head pipe 12 with a first bending portion 73 bending rearwardly at the lower end of the downwardly extending portion 70. The horizontal extending portion 71 extends rearwardly from the first bending portion 73 with a second bending portion 74 formed at the rear end of the horizontal extending portion 71 and bending rearwardly and upward. The obliquely upward extending portion 72 extends rearwardly and upward from the second bending portion 74 and is joined at the rear end thereof to corresponding one of the seat rails 14, 14. The down tube 13 is formed by bending a single continuous metal tube by a bender at the first bending portion 73 and the second bending portion 74. An interval between the left and right down tubes 13, 13 is gradually increased as it goes toward the rear side.

A pair of left and right power unit support portions 85, 85 supporting the unit swing engine U via the link members 27, 27 is formed behind the corresponding second bending portions 74, 74.

A stand stay 47A to be attached to the side stand 47 is installed on the left horizontal extending portion 71 on the side of the horizontal portion cross member 18.

Each of the seat rails 14, 14 includes a seat rail front portion 75 and a seat rail rear portion 76. The seat rail front portion 75 has a front end joined to a rear surface of a lower portion of the downwardly extending portion 70 of corresponding one of the down tubes 13, 13, extends rearwardly and upward, and is joined at its rear end to the rear end of the obliquely upward extending portion 72. The seat rail rear portion 76 extends from the rear end of the seat rail front portion 75 to the rear portion of the vehicle. An interval between the left and right seat rails 14, 14 is gradually increased as it goes toward the rear side.

A rear portion second cross member 77 connecting together the seat rails 14, 14 is installed in front of the rear portion cross member 21 for the seat rail rear portions 76, 76. The rear portion second cross member 77 and the rear portion cross member 21 are connected by a reinforcing plate 78 which extends forward and rearwardly. Grab rail stays 79 to which the grab rail 48 is connected are each installed on an upper surface of corresponding one of the seat rail rear portions 76, 76. Luggage box stays 80 to which the luggage box 44 is connected are installed in corresponding front portions of the seat rail rear portions 76, 76.

A rearwardly projecting stay 253 is attached to a central portion of the rear portion cross member 21 so as to extend rearwardly. The rear fender 66 (see FIG. 1) is mounted to the rear portion cross member 21, the reinforcing plate 78 and the rearwardly projecting stay 253.

The seat rail front portions 75, 75 are each bent through a seat rail bending portion 75A located at a rear portion thereof. The seat rails 14, 14 are each such that a portion rearwardly of the seat rail bending portion 75A has a posterosuperior angle lower than that of the front portion thereof.

The plate-like intermediate cross member 20 is installed between the rear portions of the seat rail front portions 75, 75 and located in front of rear connecting portions 81, 81 at which the seat rails 14, 14 are joined to the corresponding rear ends of the obliquely upward extending portions 72, 72. Front connecting portions 82, 82 at which the front ends of the seat rail front portions 75, 75 and the downwardly extending portions 70, 70 are joined to each other are each located at corresponding one of the lower ends of the downwardly extending portions 70, 70. The front cross member 17 is formed into a forward projecting U-shape and is joined to front surfaces of the left and right front connecting portions 82, 82. A plate-like cross member 83 connecting the seat rail front portion 75 with the horizontal extending portion 71 at a position near the front connecting portion 82 is installed behind each of the front connecting portions 82, 82. The plate-like cross member 83 is a vertically extending flat plate.

The upper tubes 15, 15 are joined at their front ends to upper portions of the head pipe 12, extend rearwardly and downwardly at an angle lower than that of the downwardly extending portion 70, and are joined at their rear ends to corresponding upper surfaces of the seat rail front portions 75, 75. Upper tube connecting portions 84, 84 at which the upper tubes 15, 15 are each joined at the lower end thereof to a corresponding one of the seat rail front portions 75, 75 are located in the rear of the plate-like cross members 83, 83. An interval between the left and right upper tubes 15, 15 is gradually increased as it goes toward the rear side. The upper tubes 15, 15 are located inside the down tubes 13, 13 over their total lengths as viewed from above.

Figure 5:
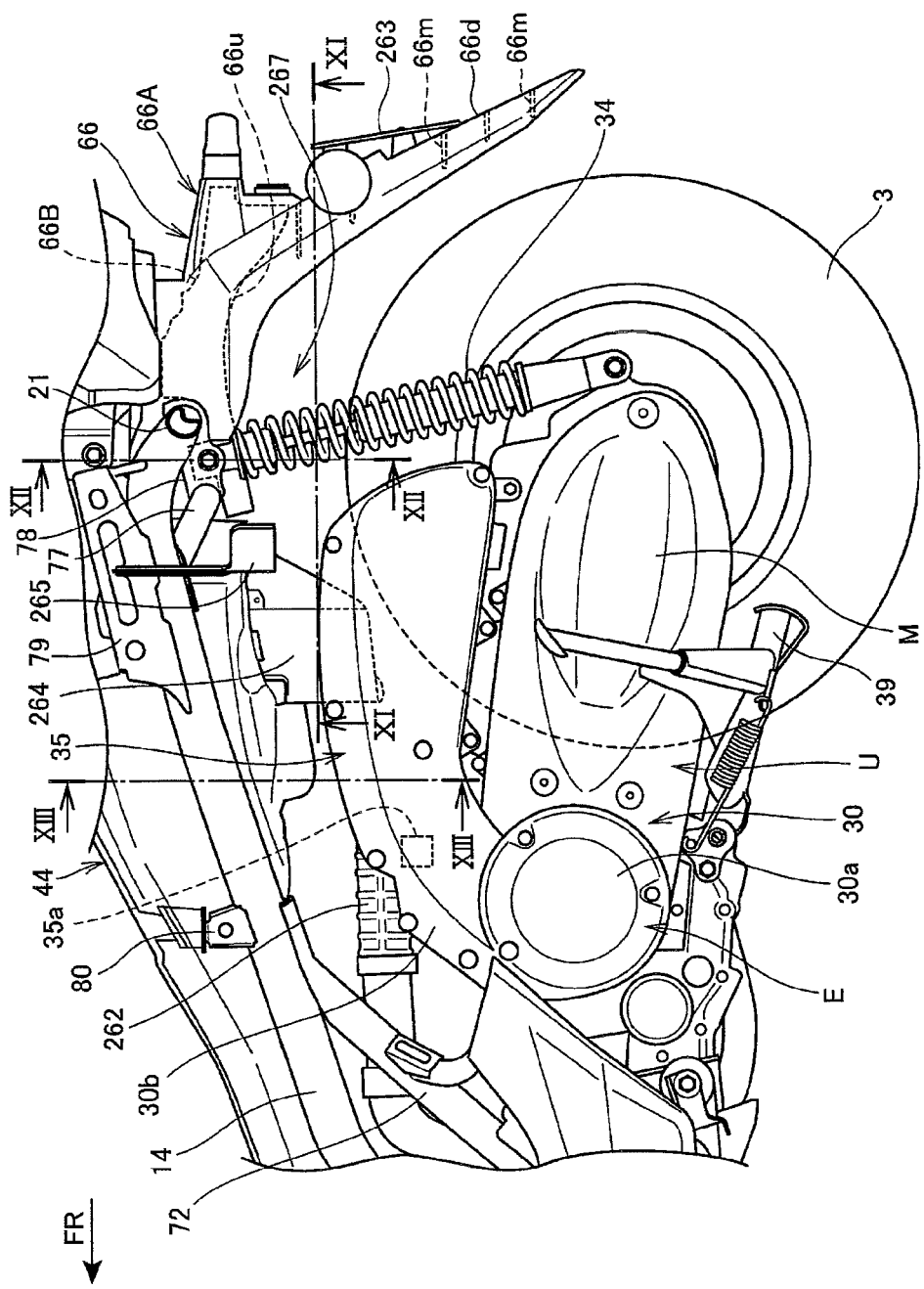
FIG. 5 is a left lateral view illustrating a rear portion of the motorcycle.

FIG. 5 is a left lateral view illustrating the rear portion of the motorcycle 1.

The throttle body is connected to the cylinder head (not shown) of the engine E via an intake pipe. The air cleaner box 35 is connected to the throttle body via the connecting tube 262. The air cleaner box 35 is provided at its front end portion with a fresh air inlet 35$a$ opening toward the lateral side. Fresh air is let in via this fresh air inlet 35$a$ into the air cleaner box 35. The lateral side of the fresh air inlet 35$a$ is covered by an upper extended portion 30$b$ of a left-front crankcase cover 30$a$ constituting the crankcase 30.

The rear fender 66 is a component part having a dual-partitioning structure composed of a first fender 66A and a second fender 66B. The first fender 66A is formed with a hanging portion 66$d$ to which a license plate 263 is attached. The second fender 66B has a large portion disposed inside the first fender 66A.

The luggage box 44 has a mudguard 264 mounted to a rear portion of the bottom thereof. The mudguard 264 is adapted to prevent rainwater or the like splashed by the rear wheel 3 from being scattered toward the front of the vehicle. A splash guard 265 is mounted to the bottom of the luggage box 44 and a rear end portion of the left seat rail 14. The splash guard 265 is adapted to prevent rainwater or the like splashed by the rear wheel 3 from being scattered toward the front of the vehicle, particularly, toward the fresh air inlet 35$a$ of the air cleaner box 35. Further, also the second fender 66B of the rear fender 66 has a structure to prevent rainwater or the like splashed by the rear wheel 3 from being scattered toward the fresh air inlet 35$a$ of the air cleaner box 35. The above-mentioned second fender 66B, mudguard 264 and splash guard 265 constitute a scattering-prevention portion 267, which prevents rainwater or the like from being scattered toward the fresh air inlet 35$a$ of the air cleaner box 35 (see FIG. 3) by the rotation of the rear wheel 3. The structure of the scattering-prevention portion 267 is hereinafter described in detail.

Figure 6:
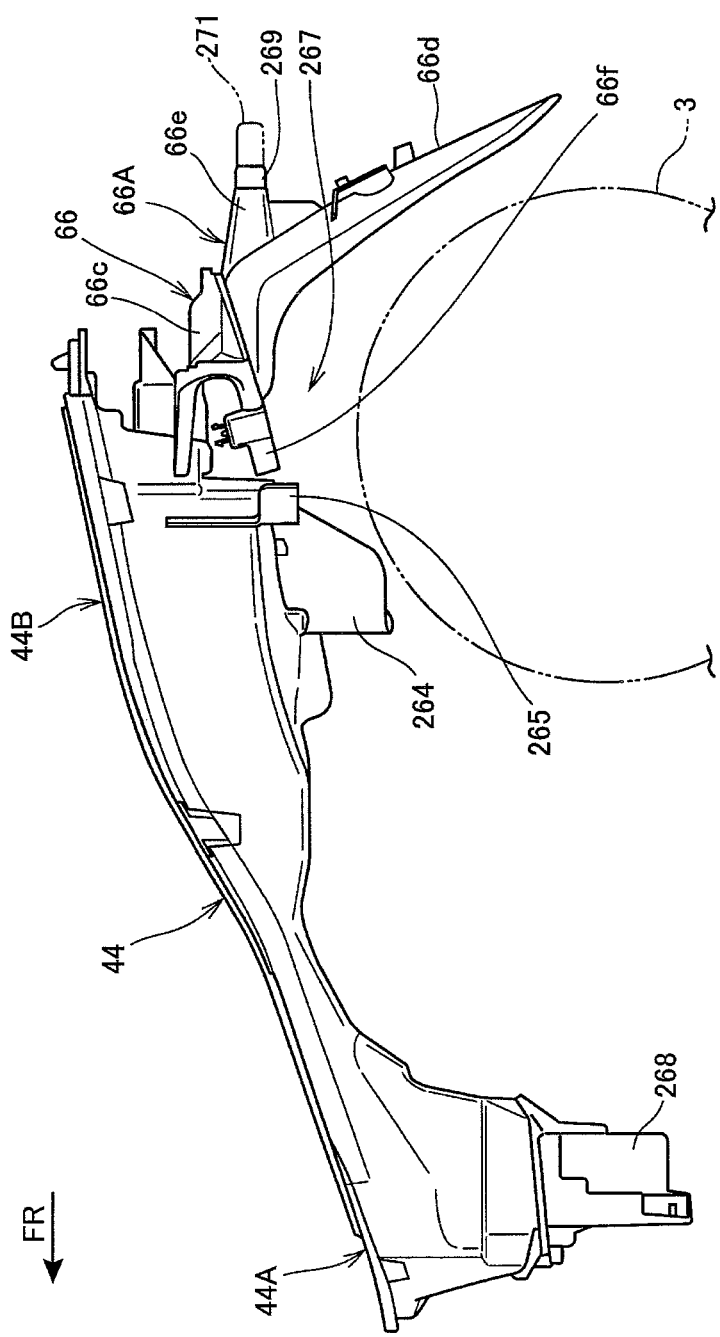
FIG. 6 is a lateral view illustrating an arrangement of a scattering-prevention portion.

FIG. 6 is a lateral view illustrating the arrangement of the scattering-prevention portion 267.

The rear fender 66 is disposed behind the luggage box 44. The mudguard 264 is disposed on a bottom wall lower surface of the rear storing portion 44B of the luggage box 44. The splash guard 265 is disposed on the bottom wall lower surface of the rear storing portion 44B and on the side of the rear storing portion 44B at a position away from the mudguard 264. In addition, a battery storing box 268 is mounted on a lower portion of the front storing portion 44A of the luggage box 44.

The first fender 66A of the rear fender 66 includes an upper base portion 66$c$ located at its upper part with the hanging portion 66$d$ integrally extending rearwardly and obliquely downwardly from the upper base portion 66$c$ and a rearwardly projecting portion 66$e$ integrally projecting rearwardly from an upper part of the hanging portion 66$d$.

An end portion 66$f$ of the second fender 66B projects forward and obliquely downwardly from a front lower part of the upper base portion 66C and is exposed to the outside. A license light 271 is attached to a rear end portion of the rearwardly projecting portion 66$e$ via an elastic member 269.

Figure 7:
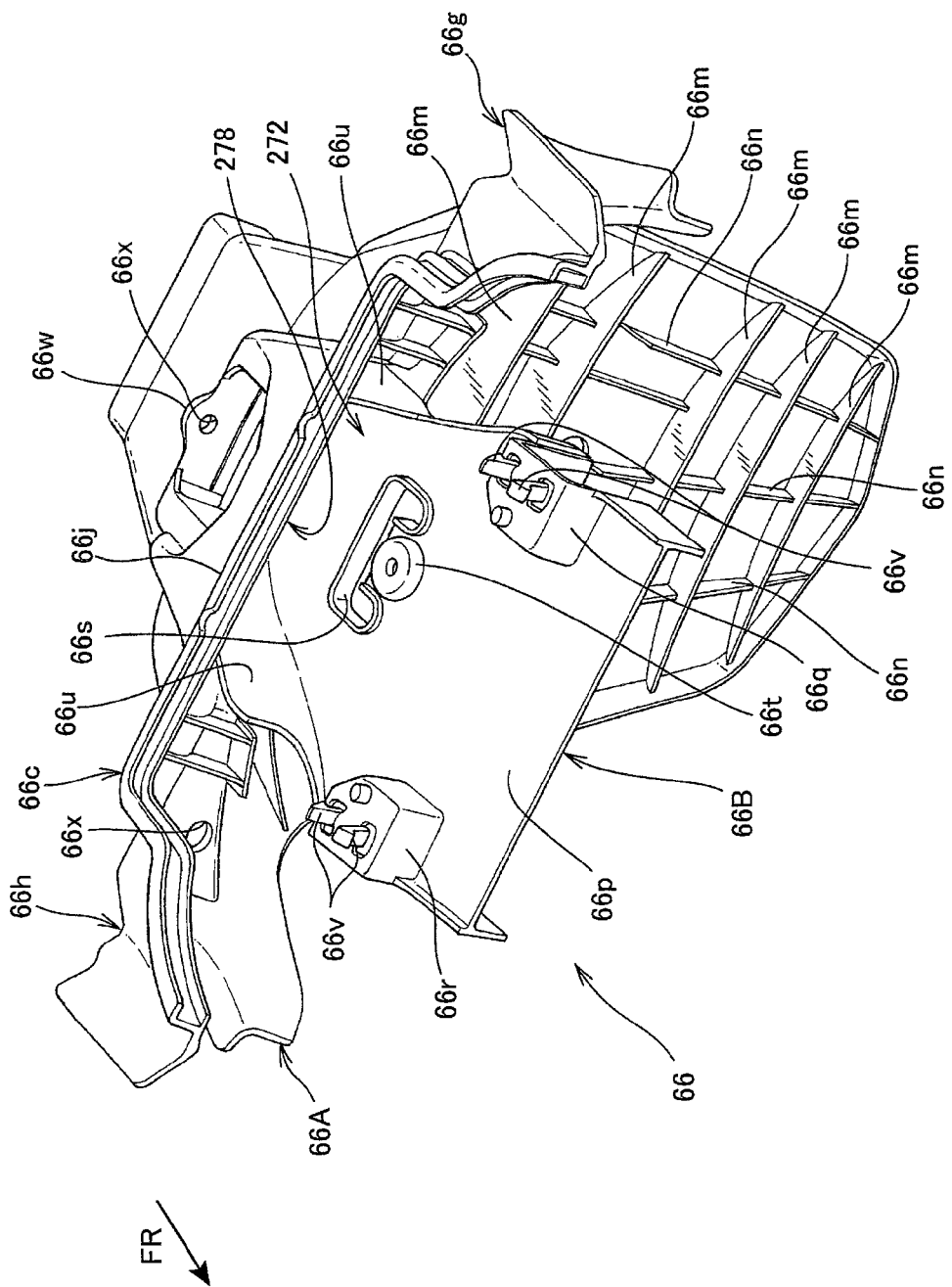
FIG. 7 is a first perspective view of a rear fender.

FIG. 7 is a first perspective view of the rear fender 66 as viewed from the front and oblique upside thereof.

The upper base portion 66$c$ of the first fender 66A has bifurcate left-right projecting portions 66$g$ and 66$h$ which project left and right. A front upper edge portion 66$j$ of the upper base portion 66$c$ including the left-right projecting portions 66$g$ and 66$h$ is formed in a shape in uniform contact with the back surface of the luggage box 44 (see FIG. 2).

The upper base portion 66$c$ is such that a longitudinal wall portion 66$w$ located at its rear end and the left-right projecting portions 66$g$ and 66$h$ are provided with a plurality of bolt insertion holes 66$x$ adapted to receive bolts passed therethrough. These bolts are attached to the body frame F (see FIG. 3), specifically, the rear portion cross member 21 (see FIG. 3) side and the rearwardly projecting stay 253 (see FIG. 3).

The second fender 66B includes a base wall 66$p$ extending rearwardly and downwardly with a pair of left and right engaging portions 66$q$ and 66$r$ installed on front portions of the base wall 66$p$ so as to project upward in order to be engaged with and mounted to the body frame F (see FIG. 2) side. An opening 66$s$ bored in a left-right-directional central portion of the base wall 66$p$ in the rear of the engaging portions 66$q$ and 66$r$ is provided with a boss 66$t$ formed on the base wall 66$p$ so as to be close to the opening 66$s$. Sidewalls 66$u$, 66$u$ are located behind the corresponding engaging portions 66$q$ and 66$r$ and vertically extending from corresponding left and right edge portions of the base wall 66$p$.

Each of the engaging portions 66$q$ and 66$r$ has a pair of upward extending claws 66$v$, 66$v$. The claws 66$v$, 66$v$ are engaged with engaged portions installed on the reinforcing plate 78 (see FIG. 3) on the body frame F side.

The base wall 66$p$ and the left and right sidewalls 66$u$, 66$u$ define, above the base wall 66$p$, an upper passage 272 U-shaped in cross-section and extending in an anteroposterior direction. The second fender 66B and the first fender 66A define a space 278 where the upper passage 272 is closed from above. A harness connected to the license light 271 (see FIG. 6) is passed through the space 278 and the rearwardly projecting stay 253 (see FIG. 3) of the body frame F is disposed in the space 278.

Figure 8:
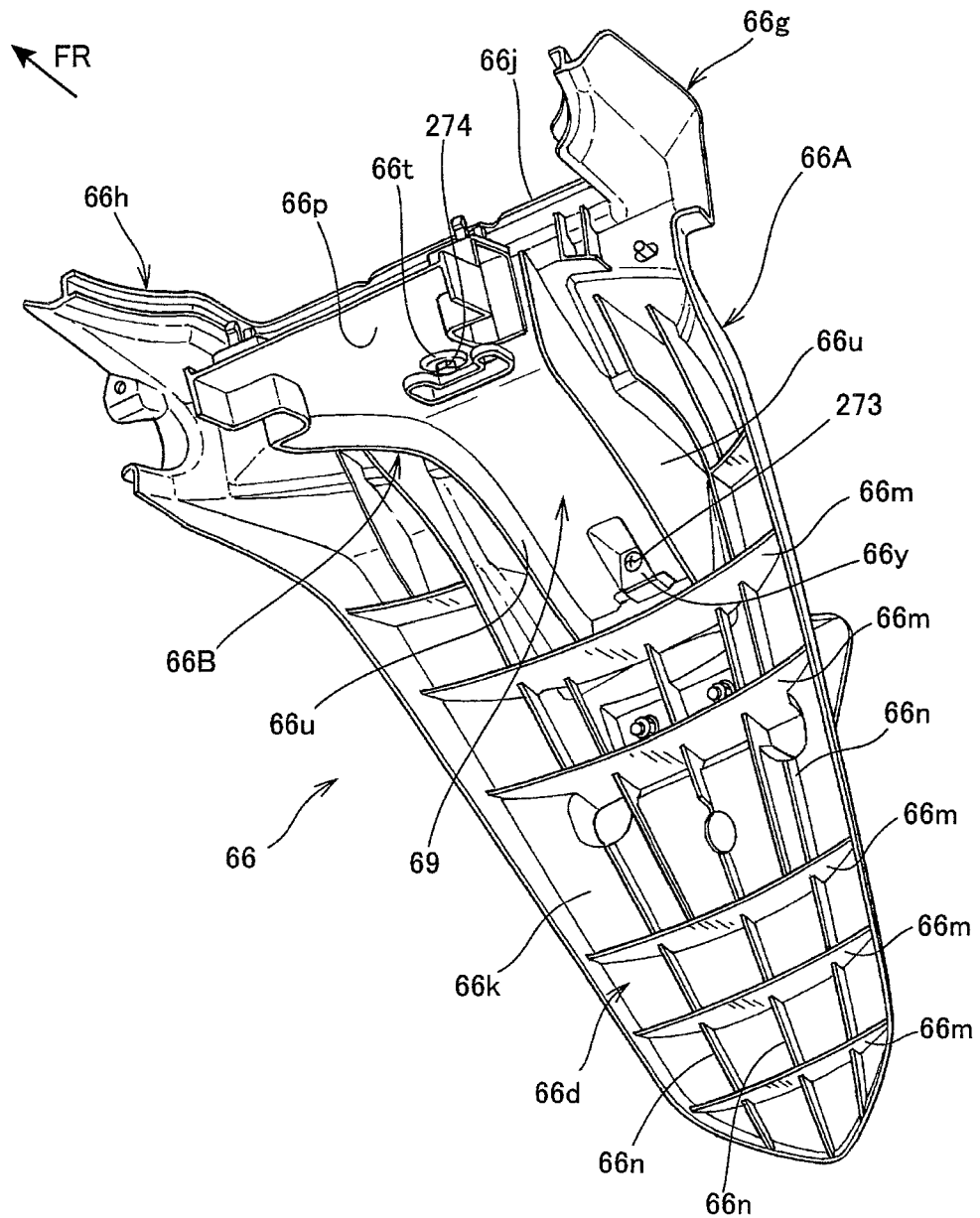
FIG. 8 is a second perspective view of the rear fender.

FIG. 8 is a second perspective view of the rear fender 66 as viewed from the front and oblique downside thereof.

The hanging portion 66$d$ of the first fender 66A is integrally formed on its interior surface 66$k$ with a plurality of transverse ribs 66$m$ which extend left and right at longitudinal intervals. Further, these transverse ribs 66$m$ are integrally connected by a plurality of longitudinal ribs 66$n$ which extend vertically. The transverse ribs 66$m$ are portions that prevent rainwater or the like splashed by the rear wheel 3 (see FIG. 5) from running along the hanging portion 66$d$ and shifting toward the second fender 66B located at the upside and oblique forward thereof.

The second fender 66B is such that a rear end attachment portion 66$y$ located at a rear end portion of the base wall 66$p$ is mounted to the first fender 66A by means of a screw 273 and the boss 66$t$ is attached to the body frame F, specifically, a lower surface of the rearwardly projecting stay 253 (see FIG. 3) by means of a bolt 274.

The base wall 66$p$ and left and right sidewalls 66$u$, 66$u$ of the second fender 66B define a water-guide passage 69 below the base wall 66$p$. The water-guide passage 69 is formed in a U-shape in cross-section extending in the anteroposterior direction so as to lead forward rainwater or the like splashed by the rear wheel 3 (see FIG. 1) in order to prevent the rainwater or the like from being scattered from side to side when the rainwater or the like strikes the second fender 66B and shifts toward the front of the vehicle.

Figure 9:
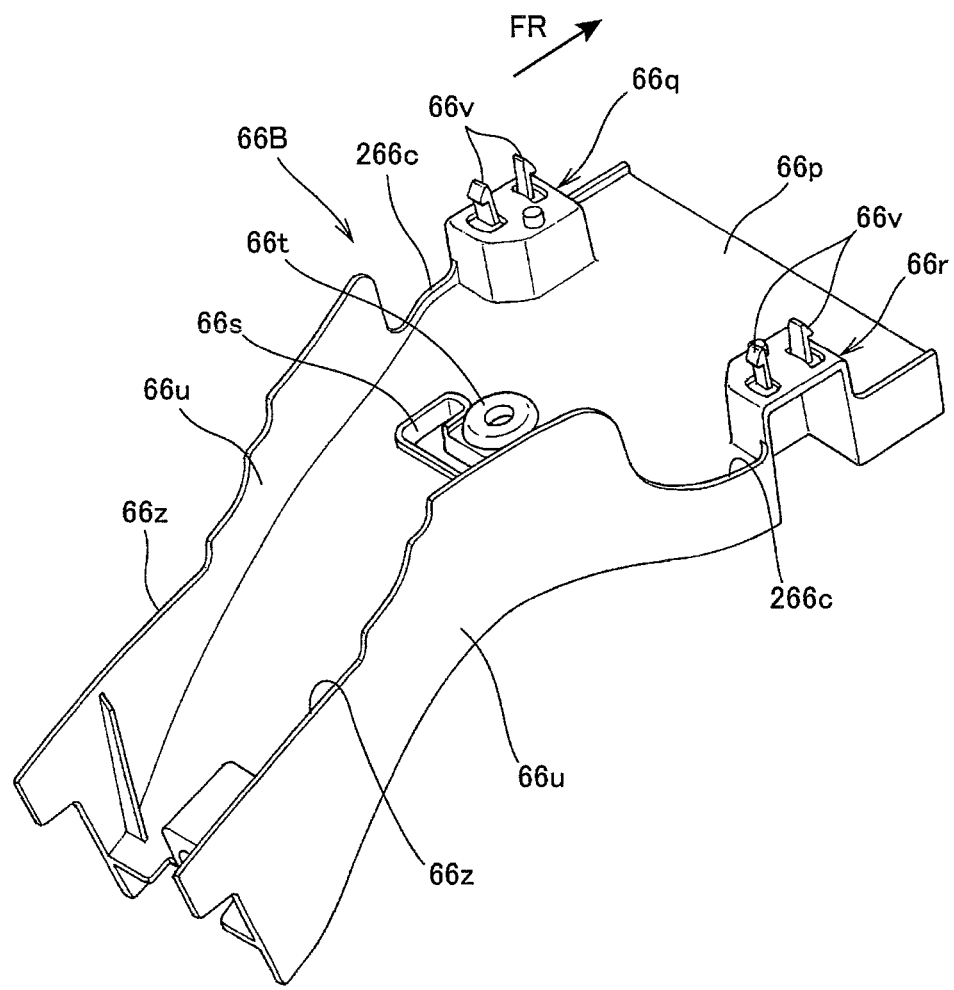
FIG. 9 is a perspective view of a second fender.

FIG. 9 is a perspective view of the second fender 66B.

The base wall 66$p$ of the second fender 66B is formed to have a front portion wide in the vehicle-width direction and a rear portion narrower in the vehicle-width direction than the front portion. The left and right sidewalls 66$u$, 66$u$ are formed to extend from a position rearwardly away from the left and right engaging portions 66q and 66r to the rear end position of the base wall 66p. As the base wall 66p extends rearwardly and obliquely downwardly, the left and right sidewalls 66u, 66u are formed to gradually increase in height from the base wall 66p as they go toward the rear direction. An upper edge 66z of the sidewall 66u is formed in a shape conforming to a lower surface of the first fender 66A (see FIG. 8). Concave cross-member insertion portions 266c, 266c adapted to receive the rear portion cross member 21 (see FIG. 3) passed therethrough are formed between the engaging portions 66q and 66r and the corresponding sidewalls 66u, 66u.

Figure 10:
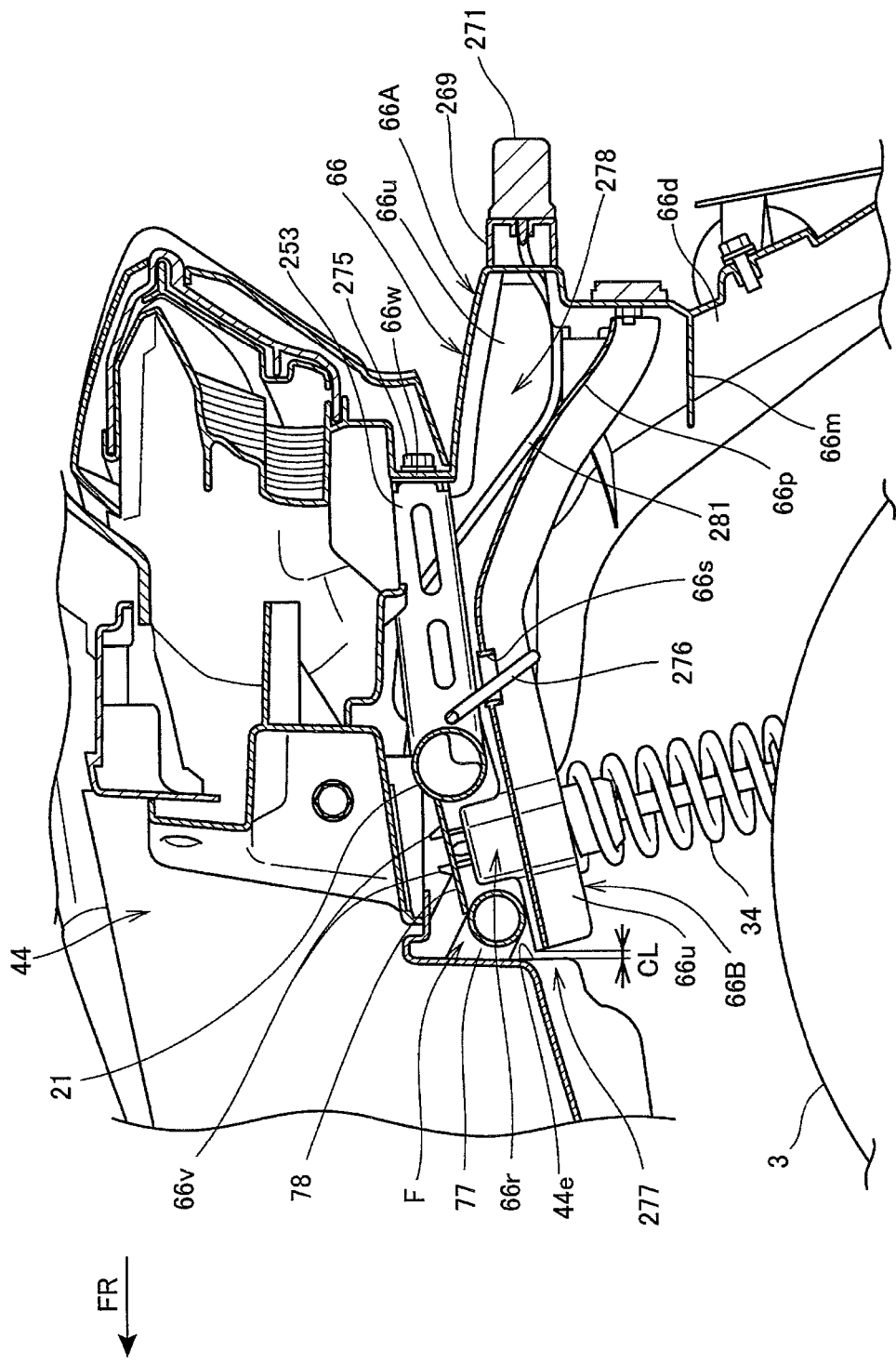
FIG. 10 is a cross-sectional view illustrating a mounting structure of the rear fender.

FIG. 10 is a cross-sectional view illustrating the attachment structure of the rear fender 66.

The rearwardly projecting stay 253 is disposed between the left and right sidewalls 66u, 66u of the second fender 66B. The longitudinal wall portion 66w of the first fender 66A is attached to the rear end portion of the rearwardly projecting stay 253 by means of a bolt 275. The engaging portions 66q and 66r (only the engaging portion 66r on the back side is shown in the figure) of the second fender 66B are attached by being engaged with engaged holes (not shown) of the reinforcing plate 78.

A hook 276 is attached to the rearwardly projecting stay 253 at a position rearwardly of and close to the rear portion cross member 21. The hook 276 passes through the opening 66s of the second fender 66B and extends downwardly and obliquely rearwardly. The hook 276 is a component part used to secure the vehicle by binding it with harnesses during the transportation of the vehicle.

A gap 277 having a minimum clearance of CL is defined between the front end of the second fender 66B and a rear longitudinal wall 44e of the luggage box 44. The gap 277 is adapted to prevent, from moving toward the luggage box 44, rainwater or the like splashed by the rear wheel 3 and running along the lower surface of the base wall 66p of the second fender 66B from the rearwardly to the front. More specifically, the lower end of the rear longitudinal wall 44e is lower than the front end of the base wall 66p of the second fender 66B. Therefore, rainwater or the like on the side of the second fender 66B strikes the rear longitudinal wall 44e and drops.

A harness 281 connected to the license light 271 is passed through the rear portion of the second fender 66B, specifically, the space 278 surrounded by the base wall 66p and left and right sidewalls 66u, 66u of the second fender 66B and the first fender 66A. As described above, the harness 281 is passed through the inside of the space 278. Therefore, the harness 281 becomes hard to be covered with dust, mud water or the like. In addition, mud water or the like is prevented from entering the inside of the license light 271 via the harness 281.

Figure 11:
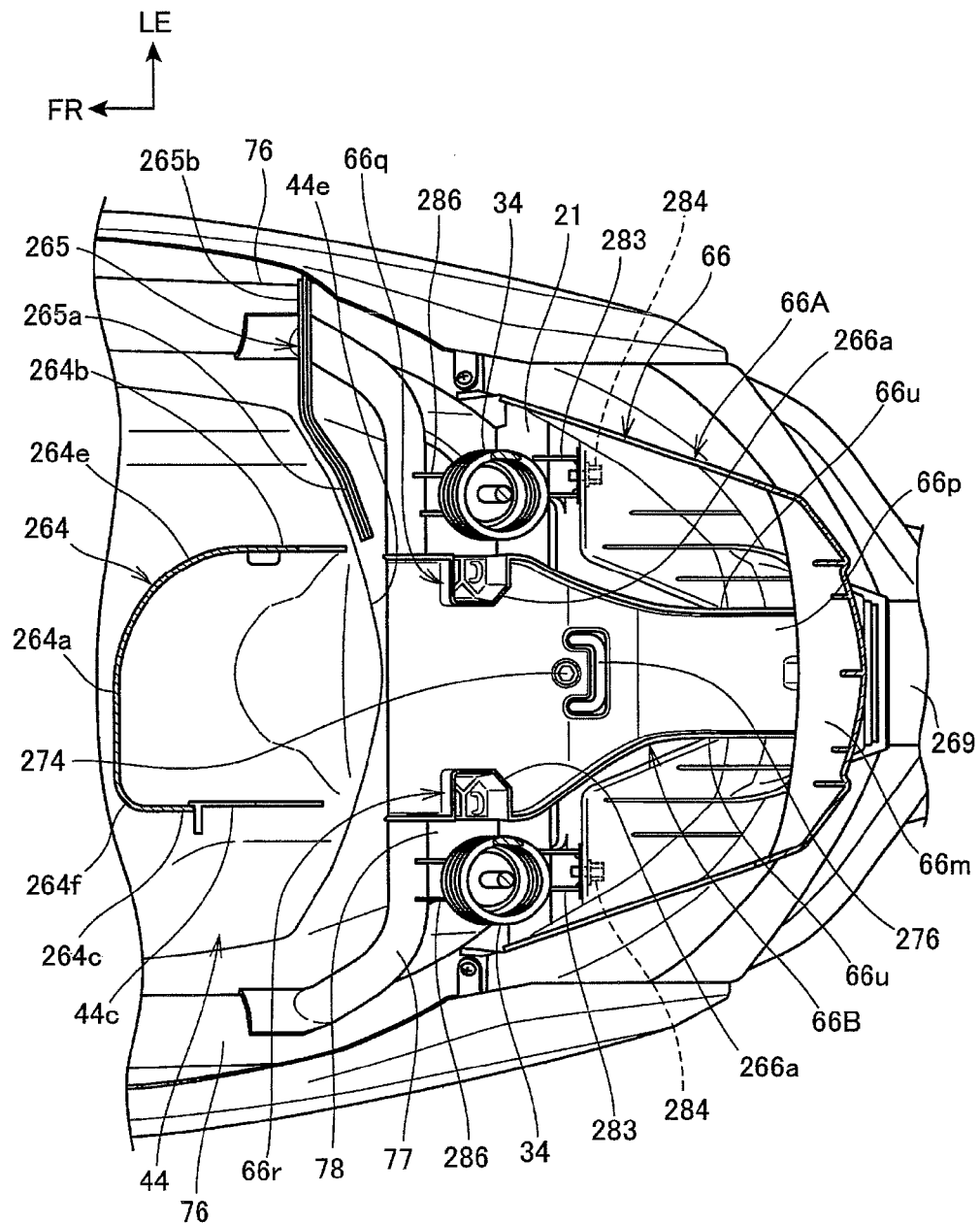
FIG. 11 is a cross-sectional view taken along line XI-XI in FIG. 5.

FIG. 11 is a cross-sectional view taken along line XI-XI in FIG. 5.

Fender support brackets 283, 283 are mounted to corresponding left and right rear portions of the rear portion cross member 21. The first fender 66A is mounted to the fender support brackets 283, 283 by means of respective bolts 284, 284.

Cushion brackets 286, 286 are installed on the rear portion cross member 21, the rear portion second cross member 77 and the reinforcing plate 78 on the left and right thereof. The rear suspensions 34, 34 are attached at their upper ends to the respective cushion brackets 286, 286. The second fender 66B has a front portion disposed between the left and right rear suspensions 34, 34. The pair of left and right engaging portions 66q and 66r of the second fender 66B is disposed on the vehicle-widthwise inside of and close to the rear suspensions 34, 34.

The engaging portions 66q and 66r are each formed with a chamfered portion 266a at a corner of the rear portion thereof. The chamfered portion 266a is adapted to prevent rainwater or the like from being scattered toward the outside of the second fender 66B and to shift it forward smoothly when the rainwater or the like shifts between the left and right sidewalls 66u, 66u toward the front of the vehicle body. The second fender 66B is formed to have the rear portion narrower in the vehicle-width direction than the front portion. Therefore, the shape of the rear portion of the second fender 66B is less likely to restrict the shape of the first fender 66A. Thus, the degree of freedom of design of the first fender 66A can be increased.

The mudguard 264 is roughly formed in a U-shape as viewed from its bottom surface, is composed of a front wall 264a, a left wall 264b and a right wall 264c and is mounted on the lower surface of the luggage box 44. The front wall 264a extends in the vehicle-width direction. The left wall 264b and the right wall 264c extend in the anteroposterior direction of the vehicle body.

The right wall 264c of the mudguard 264 has the rear end located forward of the rear end of the left wall 264b. A rearwardly wall 44c is installed on the bottom wall of the luggage box 44 at a position behind the right wall 264c so as to extend the right wall 264c. A corner portion 264e between the front wall 264a and the left wall 264b is formed to have a circular arc greater than that of a corner portion 264f between the front wall 264a and the right wall 264c. An interval between the left wall 264b and the right wall 264c is roughly equal to the width of the front portion of the second fender 66B. The left wall 264b and the right wall 264c are roughly located on respective extensions of the left and right side walls 66u, 66u of the second fender 66B.

The splash guard 265 is a component part formed like a dogleg as viewed from its bottom surface and is composed of an inside wall 265a and an outside wall 265b. The inside wall 265a is disposed along the rear longitudinal wall 44e formed in the rear portion of the luggage box 44. The outside wall 265b integrally extends outwardly in the vehicle-width direction from an outside end portion of the inside wall 265a. The inside wall 265a has an inside end portion disposed close to a position between the front end of the left sidewall 66u and the rear end of the left wall 264b of the mudguard 264. The outside wall 265b has an outside end portion which extends to the vicinity of an outer edge of the left seat rail rear portion 76.

Figure 12:
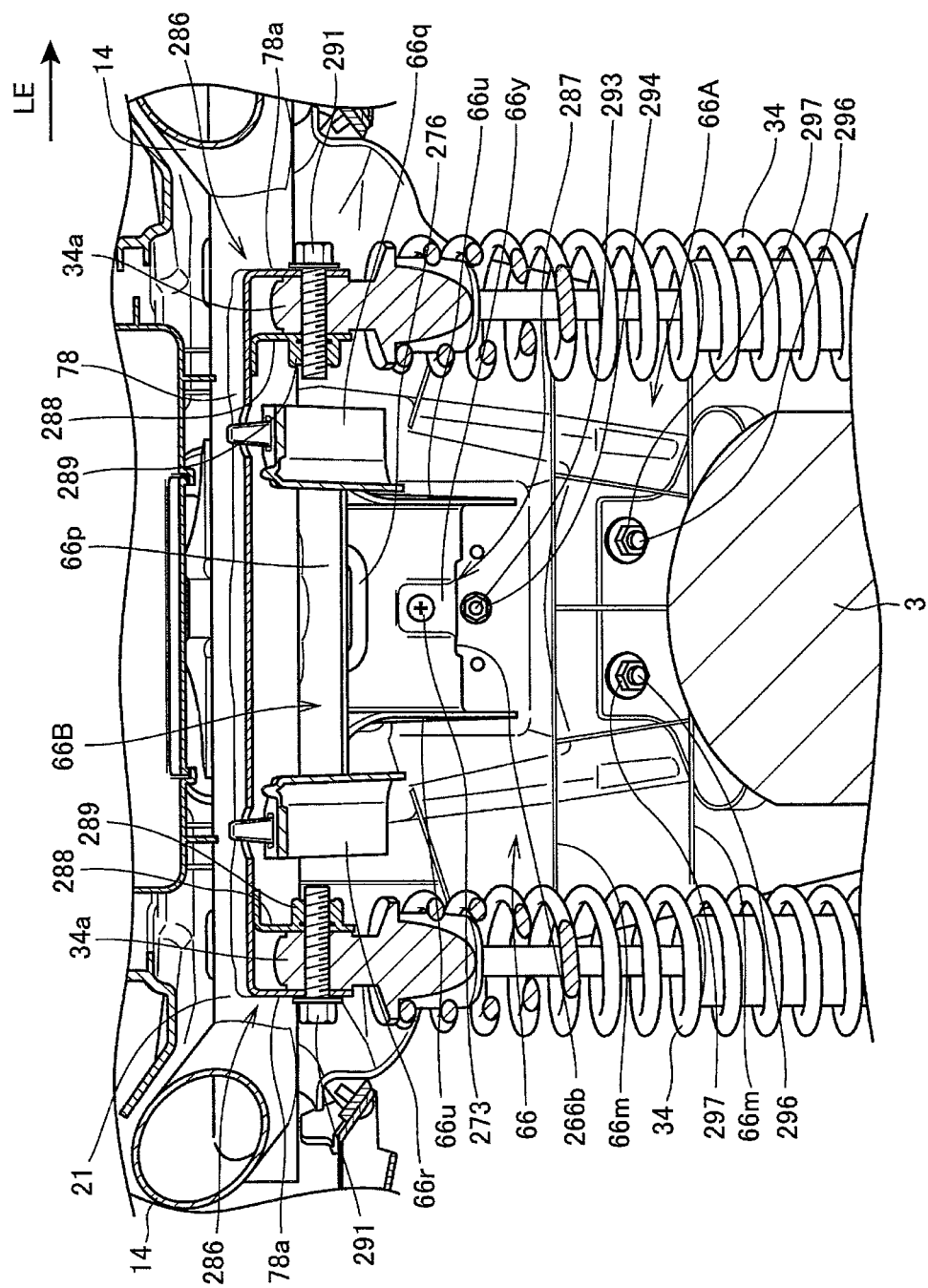
FIG. 12 is a cross-sectional view taken along line XII-XII in FIG. 5.

FIG. 12 is a cross-sectional view taken along line XII-XII in FIG. 5.

A cutout 266b is formed in the rear end portion of the base wall 66p of the second fender 66B. A gap 287 is defined between the cutout 266b and a vehicle-widthwise central portion of the first fender 66A. In this way, even if rainwater or the like enters the space 278 (see FIG. 10) between the first fender 66A and the second fender 66B, it can be discharged from the gap 287.

The cushion bracket 286 is composed of a downwardly bending portion 78a formed by bending downwardly both ends of the reinforcing plate 78 and an L-shaped bracket 288 attached to a lower surface of the reinforcing plate 78. A nut 289 is attached to the L-shaped bracket 288. The downwardly bending portion 78a and the L-shaped bracket 288 are attached also to the rear portion cross member 21 and the rear portion second cross member 77 (see FIG. 11).

The rear suspension 34 has an upper end portion 34a attached to the cushion bracket 286 by means of a bolt 291 and the nut 289. In addition, a bolt 293 and a nut 294 are used to attach a reflector to a rear surface of the first fender 66A. A bolt 296 and a nut 297 are used to attach a stay for the license plate to the rear surface of the first fender 66A.

Figure 13:
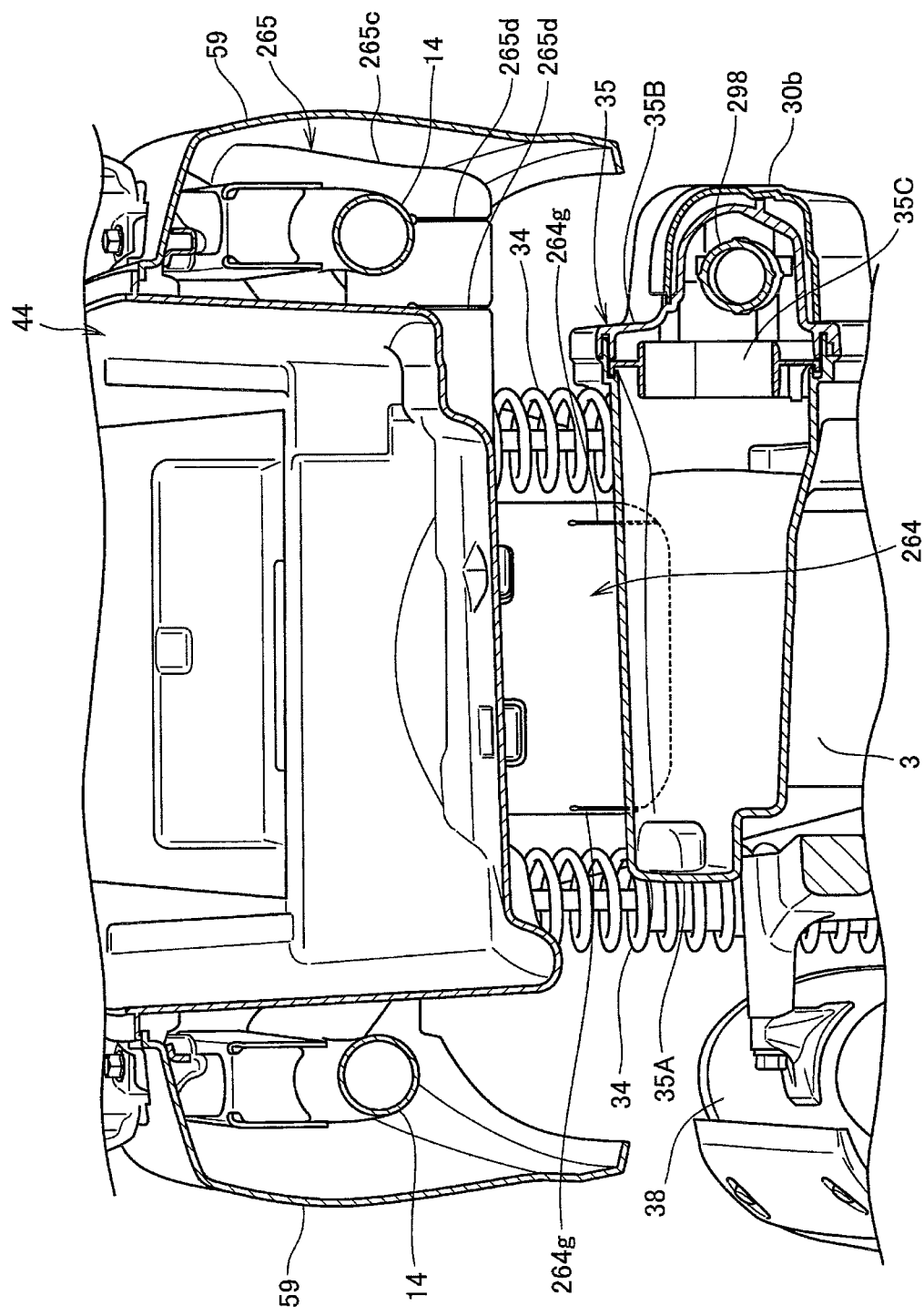
FIG. 13 is a cross-sectional view taken along line XIII-XIII in FIG. 5.

FIG. 13 is a cross-sectional view taken along line XIII-XIII in FIG. 5.

The mudguard 264 has a width greater than the tire-width of the rear wheel 3 and a plurality of slits 264g provided to extend upward from the lower end thereof.

The splash guard 265 has a left edge portion 265c projecting laterally from the seat rail 14 and a plurality of slits 265d provided to extend upward from the lower end thereof.

As described above, the mudguard 264 and the splash guard 265 are provided with the slits 264g and 265g, respectively. Therefore, the rainwater or the like adhering to rear surfaces of the mudguard 264 and the splash guard 265 can be splashed through the slits toward the rear of the vehicle body by the air flow resulting from the operation of the vehicle.

The air cleaner box 35 includes an air cleaner box main body 35A having a vehicle-widthwise width greater than that of the rear wheel 3 with an air cleaner box cover 35B closing an opening provided in the left end of the air cleaner box main body 35A. An air cleaner element 35C is held between and secured by the air cleaner box main body 35A and the air cleaner box cover 35B. An air intake duct 298 communicating with the fresh air inlet 35a (see FIG. 5) is connected to the air cleaner box cover 35B. The connecting tube 262 (see FIG. 5) is connected to the air cleaner box main body 35A. The splash guard 265 is disposed in the rear of the air intake duct 298 and the fresh air inlet 35a with respect to the vehicle body.

A description is next given of the operation of the scattering-prevention portion 267 described above.

Figure 14:
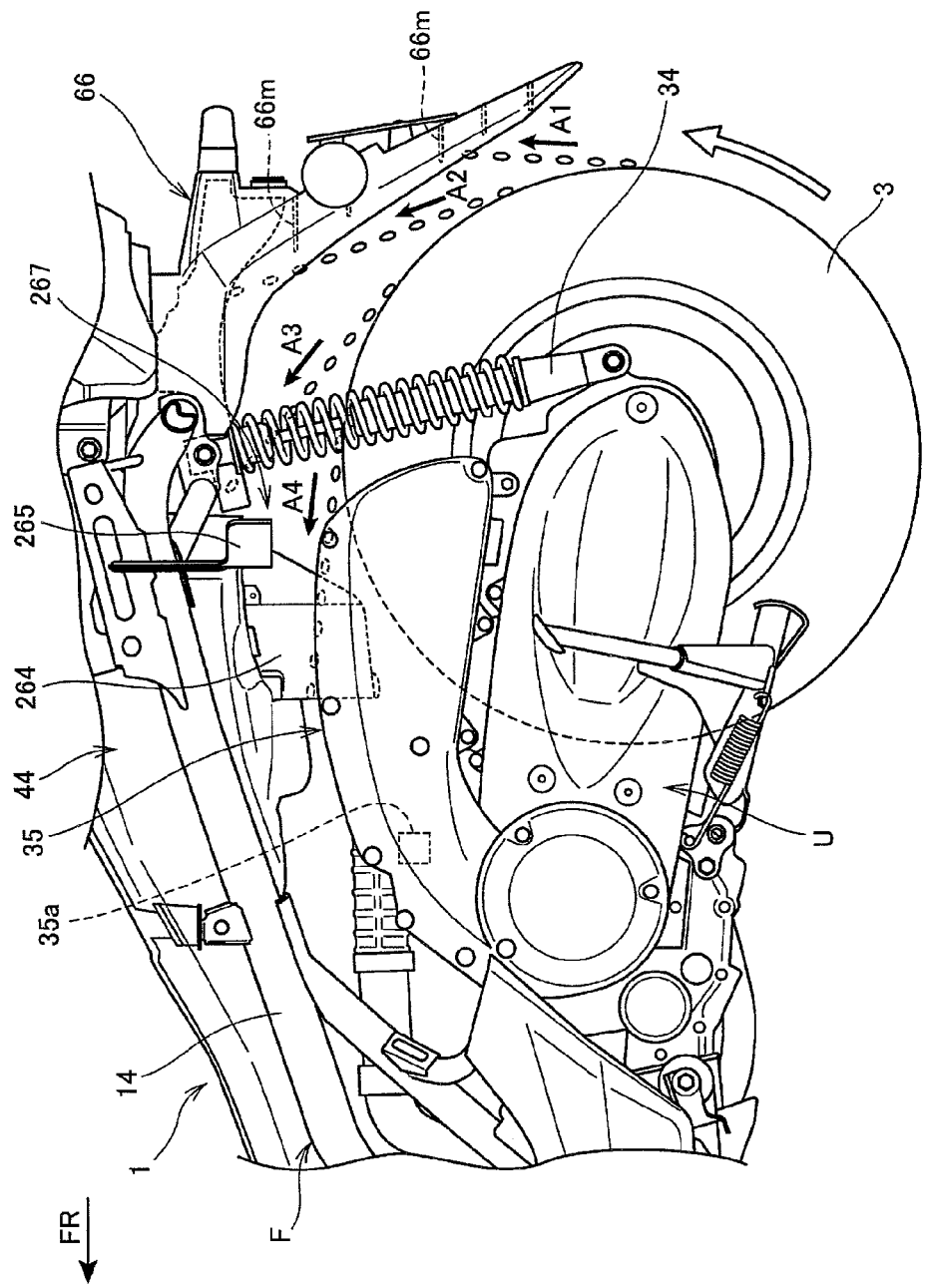
FIG. 14 is a left lateral view of the rear portion of the motorcycle, illustrating operation of the scattering-prevention portion.
Figure 15:
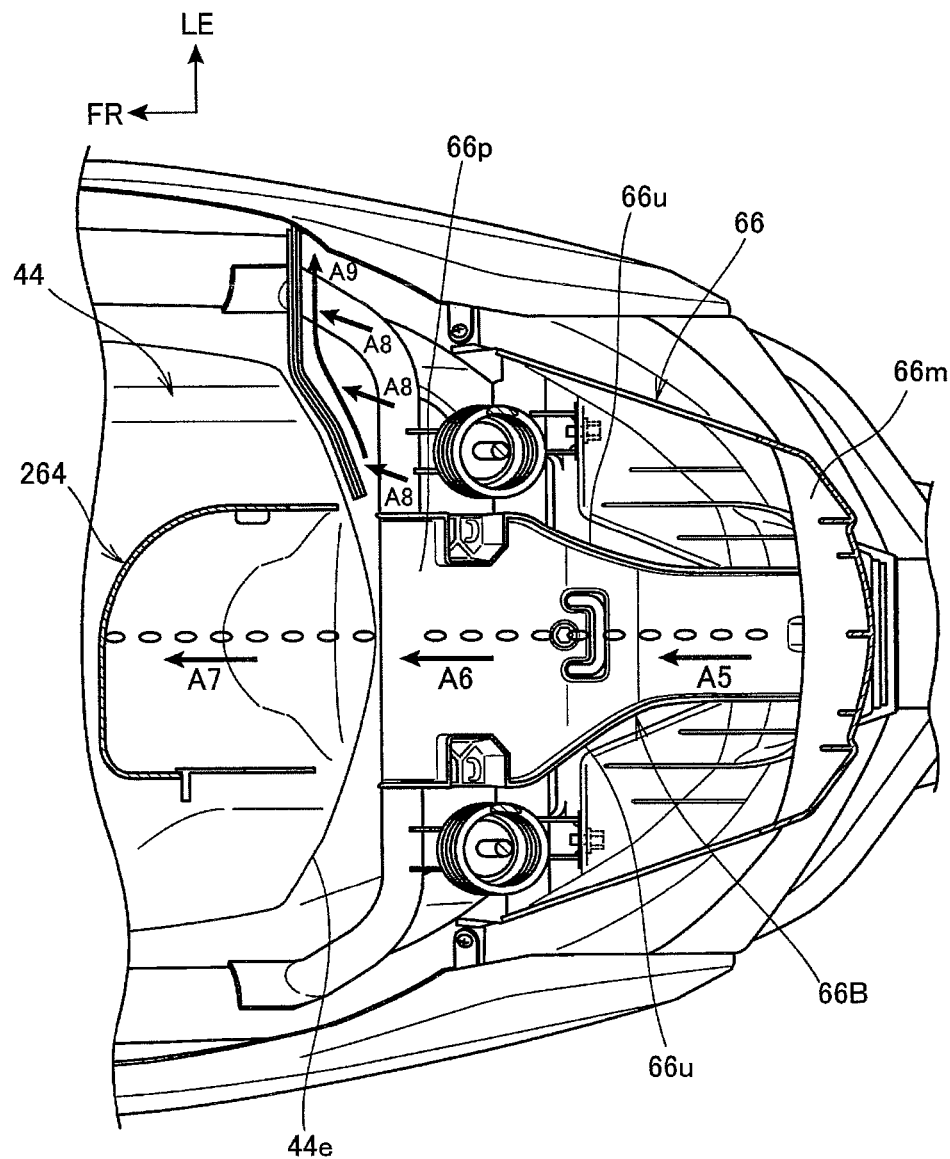
FIG. 15 is a bottom view of the rear portion of the motorcycle, illustrating the operation of the scattering-prevention portion.

FIG. 14 is a left lateral view of the rear portion of the motorcycle 1, illustrating the operation of the scattering-prevention portion 267. FIG. 15 is a bottom view of the rear portion of the motorcycle 1, illustrating the operation of the scattering-prevention portion 267.

As shown in FIG. 14, when the rear wheel 3 is rotated as indicated by a blank arrow during the operation of the motorcycle 1, rainwater or the like adhering to the rear wheel 3 is splashed toward the vehicle body, i.e., toward the rear fender 66, the luggage box 44 or the like as indicated by arrows A1 to A4.

As shown in FIG. 15, the rainwater or the like splashed toward the rear fender 66 is moved from the rear portion to a front portion of the second fender 66B, specifically, runs along the bottom surface of the base wall 66p between the left and right sidewalls 66u, 66u, and moves toward the front of the vehicle body, as indicated by arrows A5 and A6. The front end of the second fender 66B is away from the rear longitudinal wall 44e of the luggage box 44. Therefore, the rainwater or the like on the second fender 66B side is hard to move toward the luggage box 44 side. Further, the rear longitudinal wall 44e of the luggage box 44 is projected downwardly compared to the lower surface of the base wall 66p of the second fender 66B. The rainwater or the like that has moved toward the rear longitudinal wall 44e side drops and thus is hard to further move toward the front of the vehicle body.

In addition, the rainwater or the like splashed from the rear wheel 3 to the bottom wall of the luggage box 44 runs along the bottom surface of the rear portion of the luggage box 44 toward the front as indicated by arrow A7. However, most of the rainwater or the like is prevented by the mudguard 264 from moving toward the front of the vehicle body, so that it drops. Further, as indicated by arrows A8, the rainwater or the like that gets across the sidewall 66u from the inside of the second fender 66B and moves toward the left of the vehicle body, or the rainwater or the like that moves toward the left of the vehicle body directly from the rear wheel 3 is prevented by the splash guard 265 from further moving toward the front of the vehicle body and moves laterally as indicated by arrow A9. Thus, in FIG. 14, rainwater or the like can be prevented from entering the fresh air inlet 35a of the air cleaner box 35 located in front of the mudguard 264 and the splash guard 265.

As shown in FIGS. 1, 5 and 8 described above, the rear structure of the motorcycle 1 as a saddle-ride type vehicle is such that the rear fender 66 is configured to be halved into the first fender 66A formed with the hanging portion 66d to cover the back and upside of the rear wheel 3 and the second fender 66B covering the upside of the rear wheel 3. The first fender 66A and second fender 66B are joined together. In this rear structure of the motorcycle 1, the fresh air inlet 35a of the air cleaner box 35 is provided lateral to and in front of the rear wheel 3. The first fender 66A and the second fender 66B are arranged to overlap each other in the anteroposterior direction. The second fender 66B is disposed on the vehicle-widthwise inside of the first fender 66A. The second fender 66B is provided on both the vehicle-widthwise side ends with the sidewalls 66u, 66u extending in the anteroposterior direction and downwardly.

According to this configuration, even in the structure in which the fresh air inlet 35a of the air cleaner box 35 is provided lateral to and in front of the rear wheel 3, rainwater or the like splashed from the rear wheel 3 can be collected in the vehicle-widthwise central portion of the rear fender 66, i.e., in the water-guide passage 69 of the second fender 66B by the left and right sidewalls 66u, 66u of the second fender 66B. It is possible to prevent rainwater or the like from entering the fresh air inlet 35a disposed laterally. Thus, it is possible to lead sufficient fresh air into the air cleaner box 35.

As shown in FIGS. 5, 10 and 11, the opposite surface of the first fender 66A to the rear wheel 3 is provided below the second fender 66B with the transverse ribs 66m as rib walls extending in the vehicle-width direction and forward. Therefore, rainwater or the like splashed from the rear wheel 3 strikes the plurality of transverse ribs 66m so that it becomes hard to move upward along the hanging portion 66d of the first fender 66A. The amount of rainwater or the like splashed by the rear wheel 3 and led to between the sidewalls 66u, 66u of the second fender 66B can be suppressed by the transverse ribs 66m. Thus, the rainwater or the like entering the fresh air inlet 35a can further be suppressed.

As shown in FIGS. 3, 10 and 11, the rear portion cross member 21 as a cross member connecting together the pair of left and right seat rails 14, 14 is provided and the second fender 66B is secured to the rear portion cross member 21. More specifically, the engaging portions 66q and 66r of the second fender 66B are attached to the rear portion cross member 21 via the reinforcing plate 78. In addition, the base wall 66p of the second fender 66B is attached to the rear portion cross member 21 via the rearwardly projecting stay 253. Therefore, the second fender 66B can be secured without being enlarged in the vehicle-width direction. It can be intended to reduce the weight of the second fender 66B and thus that of the rear fender 66. Further, it is possible to increase the degree of freedom of the design of the first fender 66A to which the second fender 66B is mounted.

As shown in FIGS. 7, 9 and 10, the license light 271 as a lamp is installed on the back surface of the first fender 66A at a position in the rear of the second fender 66B. The harness 281 connected to the license light 271 is disposed in the space 278 between the first fender 66A and the second fender 66B. Therefore, the harness 281 can be guided by the second fender 66B. In addition, it is possible to prevent rainwater or the like from covering the inside of the license light 271 and the harness 281. Thus, it is possible to improve the reliability of the motorcycle 1 (see FIG. 1).

As described above, the second fender 66B is configured to be divided from the first fender 66A as shown in FIGS. 7 to 9, whereby the second fender 66B is formed to have the water-guide passage 69 in the lower portion and the upper passage 272 serving as the space 278 in the upper portion. In this way, it is intended to collect the splashed rainwater or the like in the vehicle-widthwise central portion and to prevent rainwater from covering the harness 281.

As shown in FIGS. 6, 10 and 11, the luggage box 44 is installed in front of the second fender 66B in such a manner that its bottom wall lower surface faces the rear wheel 3. In addition, the given gap 277 is provided between the front end of the second fender 66B and the bottom wall rear end (i.e., the rear longitudinal wall 44e) of the luggage box 44. Therefore, the provision of the given gap 277 cuts off a route along which liquid such as rainwater moves on the second fender 66B from the rear toward the front. Therefore, the movement of the rainwater or the like can be suppressed. Further, the rear longitudinal wall 44e extends downwardly compared to the lower surface of the base wall 66p of the second fender 66B. Therefore, even if the rainwater or the like is scattered from the base wall 66p toward the luggage box 44, the rear longitudinal wall 44e allows the rainwater or the like to drop, which makes it possible to prevent the rainwater or the like from moving toward the front of the vehicle body.

As shown in FIGS. 5, 11 and 13, the splash guard 265 as a shield wall is installed on the side where the fresh air inlet 35a is disposed in the vehicle-width direction (i.e., on the left side of the vehicle body), and between the second fender 66B and the fresh air inlet 35a in the anteroposterior direction. Therefore, even if rainwater or the like is splashed toward the outside of the left sidewall 66u of the second fender 66B, the splash guard 265 can prevent the rainwater or the like from entering the fresh air inlet 35a provided on the front end side of the air intake duct 298.

In addition, the splash guard 265 is formed with the plurality of slits 265d. Therefore, the rainwater or the like adhering to the rear surface of the splash guard 265 can be scattered rearwardly by air flow resulting from the operation of the vehicle and passing through the slits 265d. Thus, the splash guard 265 can make it harder for the rainwater or the like to move toward the fresh air inlet 35a in front of the splash guard 265.

Figure 16:
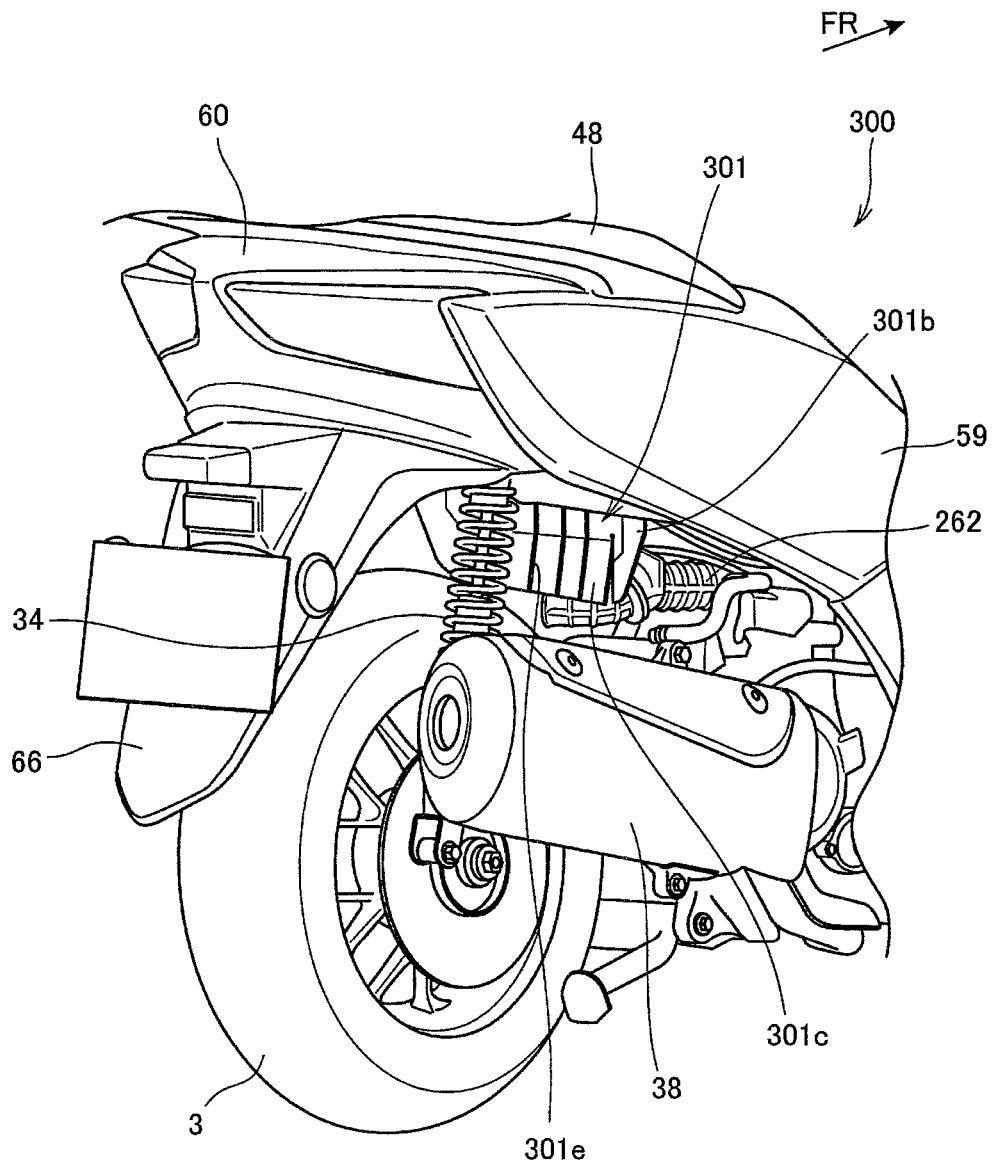
FIG. 16 is a perspective view illustrating a rear portion of a motorcycle according to a second embodiment.

FIG. 16 is a perspective view illustrating a rear portion of a motorcycle 300 according to a second embodiment. The same configurations as those of the first embodiment shown in FIG. 1 are attached with the same reference symbols and their detailed explanations are omitted.

The motorcycle 300 as a saddle-ride type vehicle is provided with a splash guard 301 in the rear portion of the vehicle body. The splash guard 301 is adapted to prevent rainwater or the like splashed by the rear wheel 3 from being scattered toward the front of the vehicle, particularly, toward the fresh air inlet 35a (see FIG. 5) of the air cleaner box 35 (see FIG. 5) or the like.

The rainwater, mud or the like splashed by the rear wheel 3 can be prevented from being collected in a particular site of the vehicle by the shape and angle of the splash guard 301 when striking the splash guard 301 and then being circumferentially scattered.

Figure 17:
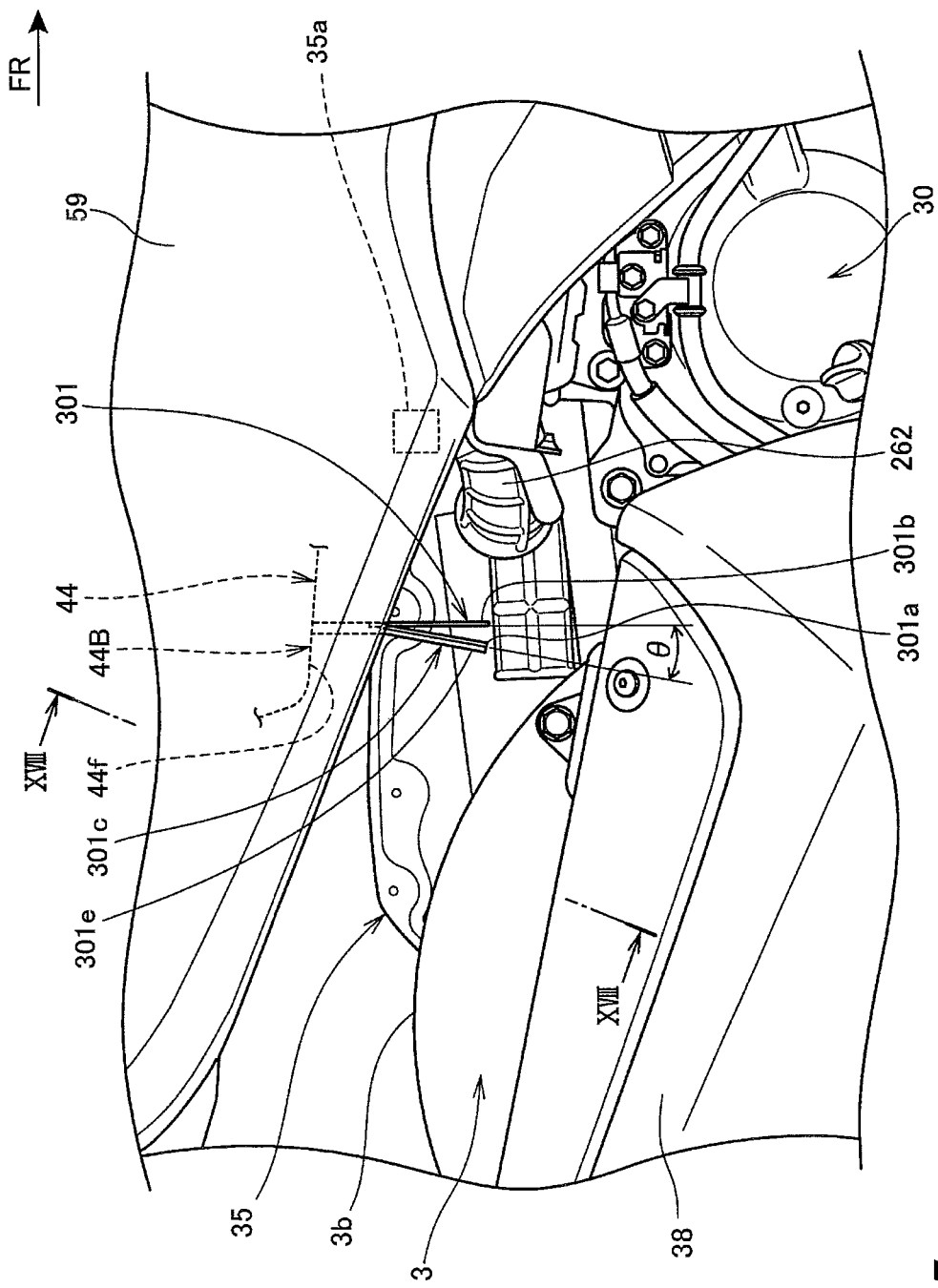
FIG. 17 is a right lateral view illustrating the rear portion of the vehicle, illustrating a splash guard.

FIG. 17 is a right lateral view of the rear portion of the vehicle, illustrating the splash guard 301.

The splash guard 301 is mounted to a lower surface of a bottom wall 44f in the rear storing portion 44B of the luggage box 44. The splash guard 301 has a lower edge 301a which is disposed below and in front of an upper end portion 3b of the rear wheel 3 and disposed in the rear of the fresh air inlet 35a of the air cleaner box 35. More specifically, the splash guard 301 is disposed between the upper end portion 3b of the rear wheel 3 and the fresh air inlet 35a. In this way, the rainwater, mud or the like splashed from the rear wheel 3 can be prevented from being scattered toward the fresh air inlet 35a by the splash guard 301.

The splash guard 301 has an inclined portion 301c inclined at an angle θ so that its plane may be oriented rearwardly and obliquely upward with respect to a roughly vertically extending base portion 301b. Since the inclined portion 301c inclined as mentioned above is provided, when rainwater, mud or the like splashed toward the front side of the vehicle body from an outer circumferential surface including the upper end portion 3b of the rear wheel 3 located above the lower edge 301a of the splash guard 301 strikes the splash guard 301, the rainwater, mud or the like can be prevented by the splash guard 301 from being scattered toward the front of the vehicle body. Thus, it is possible to further prevent the rainwater, mud or the like from being scattered toward the fresh air inlet 35a and other auxiliary machines.

Figure 18:
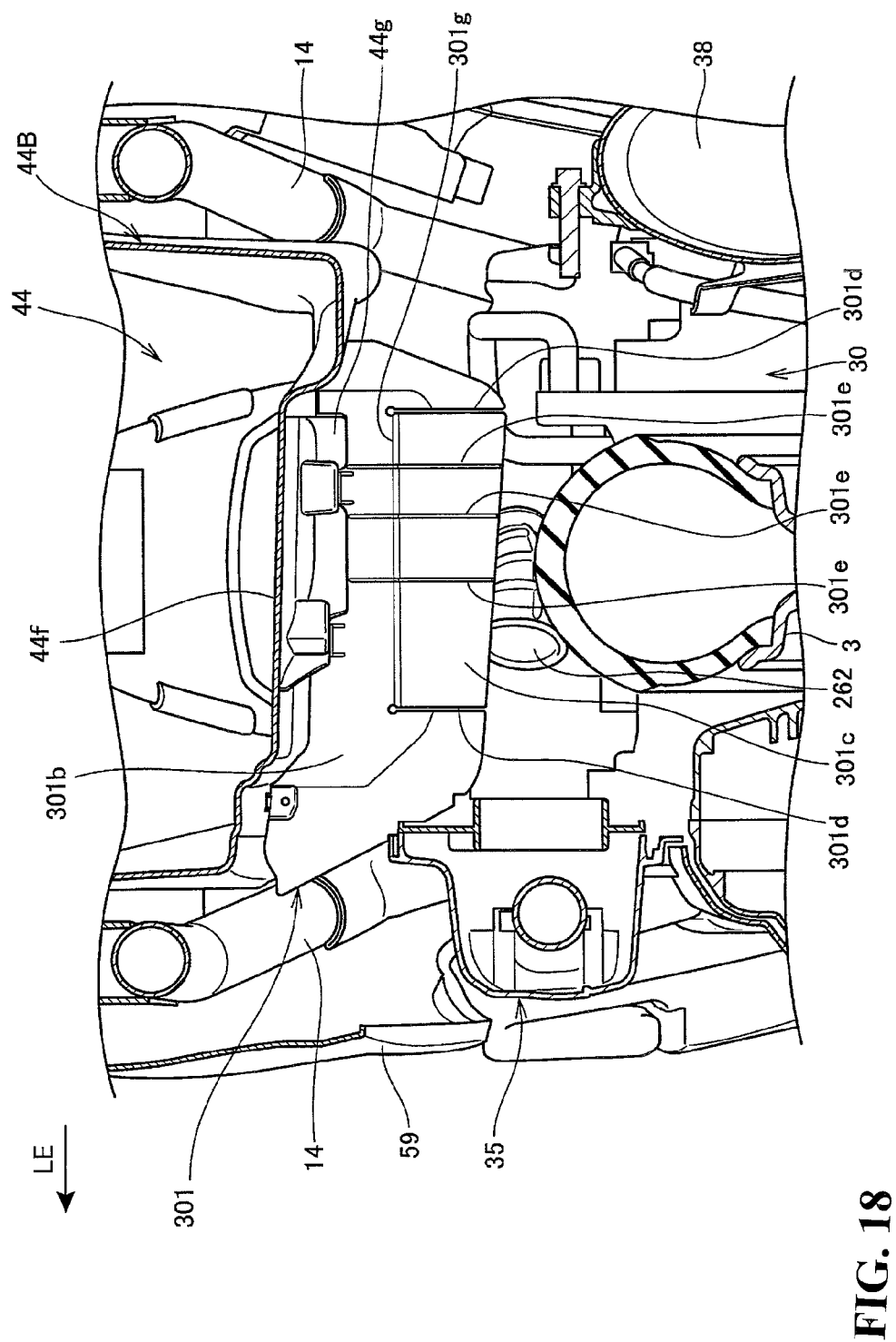
FIG. 18 is a cross-sectional view taken along line XVIII-XVIII in FIG. 17.

FIG. 18 is a cross-sectional view taken along line XVIII-XVIII in FIG. 17.

The splash guard 301 is a plate-like member formed in a roughly trapezoidal shape as a whole as viewed from the rear surface. The splash guard 301 includes the base portion 301b and the inclined portion 301c. The base portion 301b is mounted to the lower surface of the bottom wall 44f in the rear storing portion 44B of the luggage box 44 so as to extend in the vehicle-width direction. The inclined portion 301c is provided on a lower portion of the base portion 301b in roughly rectangular form. The splash guard 301 is disposed inside the pair of left and right seat rails 14, 14 and close to the left seat rail 14 (on the air cleaner box 35 side) between the seat rails 14, 14. In addition, a bending portion 301g serves as a boundary between the base portion 301b and the inclined portion 301c.

An upper portion of the base portion 301b, which is a mounting portion to the luggage box 44, is supported at its rear surface by a downwardly projecting wall 44g provided integrally with the lower surface of the bottom wall 44f of the luggage box 44. Therefore, the supporting rigidity of the splash guard 301 is increased by the downwardly projecting wall 44g.

The base portion 301b and the inclined portion 301c are isolated from each other via slits 301d, 301d in the vehicle-width direction. The slits 301d, 301d are portions extending in the vertical direction and are located on the lateral side of both side surfaces of the rear wheel 3 with respect to the vehicle body. In addition, the slits 301d, 301d play a role of scattering the rainwater or the like adhering to the rear surface of the splash guard 301 toward the rearwardly of the vehicle body by air flow resulting from the operation of the vehicle.

A plurality of longitudinal ribs 301e are installed on the rear surfaces of the base portion 301b and the inclined portion 301c so as to be integrally formed to project toward the rear of the vehicle and extend vertically and to be rowed in the vehicle-width direction. The longitudinal ribs 301e project rearwardly from the rear surfaces of the base portion 301b and the inclined portion 301c. Therefore, when rainwater, mud or the like splashed from the rear wheel 3 strikes the splash guard 301 and then is about to be scattered, it becomes hard to be scattered in the vehicle-width direction and can be allowed to drop along the longitudinal ribs 301e. Thus, it is possible to prevent the rainwater, mud or the like from being collected in a particular place of the vehicle and from being scattered. The longitudinal ribs 301e can improve the rigidity of the splash guard 301, thereby suppressing the vibration of the splash guard 301 resulting from the vibration of the vehicle body.

The embodiment described above strictly shows one aspect of the present invention. The present invention can arbitrarily be modified and applied in a range not departing from the gist of the present invention.

Further, the present invention can be applied not only to the motorcycle 1 but saddle-ride type vehicles other than the motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear structure of a saddle-ride vehicle having a rear fender halved into a first fender and a second fender connected to each other, the first fender being formed with a hanging portion for covering the rear and upside of a rear wheel and the second fender covering the upside of the rear wheel, comprising:
    a fresh air inlet provided lateral to and in front of the rear wheel;
    said first fender and the second fender being disposed to overlap each other in an anteroposterior direction with the second fender being disposed on the vehicle-widthwise inside of the first fender, and the second fender having anteroposteriorly and downwardly extending sidewalls at both vehicle-widthwise lateral end portions.

2. The rear structure of a saddle-ride vehicle according to claim 1, wherein a vehicle-widthwise and forward extending rib wall is installed on an opposite surface of the first fender to the rear wheel at a position below the second fender.

3. The rear structure of a saddle-ride vehicle according to claim 2, wherein a shield wall is installed on a side where the fresh air inlet is disposed in a vehicle-width direction, and between the second fender and the fresh air inlet in the anteroposterior direction.

4. The rear structure of a saddle-ride vehicle according to claim 2, wherein a cross member connecting a pair of left and right seat rails together is provided, and the second fender is secured to the cross member.

5. The rear structure of a saddle-ride vehicle according to claim 2, wherein a luggage box is disposed in front of the second fender, said luggage box including a bottom wall lower surface located to face the rear wheel with a predetermined gap being provided between a front end of the second fender and a bottom wall rear end of the luggage box.

6. The rear structure of a saddle-ride vehicle according to claim 2, wherein a lamp is installed on a rear surface of the first fender at a position to the rear of the second fender, and a harness connected to the lamp is disposed between the first fender and the second fender.

7. The rear structure of a saddle-ride vehicle according to claim 1, wherein a cross member connecting a pair of left and right seat rails together is provided, and the second fender is secured to the cross member.

8. The rear structure of a saddle-ride vehicle according to claim 7, wherein a lamp is installed on a rear surface of the first fender at a position to the rear of the second fender, and a harness connected to the lamp is disposed between the first fender and the second fender.

9. The rear structure of a saddle-ride vehicle according to claim 1, wherein a lamp is installed on a rear surface of the first fender at a position to the rear of the second fender, and a harness connected to the lamp is disposed between the first fender and the second fender.

10. The rear structure of a saddle-ride vehicle according to claim 1, wherein a luggage box is disposed in front of the second fender, said luggage box including a bottom wall lower surface located to face the rear wheel with a predetermined gap being provided between a front end of the second fender and a bottom wall rear end of the luggage box.

11. The rear structure of a saddle-ride vehicle according to claim 1, wherein a shield wall is installed on a side where the fresh air inlet is disposed in a vehicle-width direction, and between the second fender and the fresh air inlet in the anteroposterior direction.

12. The rear structure of a saddle-ride vehicle according to claim 11, wherein the shield wall is formed with a slit.

13. The rear structure of a saddle-ride vehicle according to claim 12, wherein the shield wall is provided with a plurality of longitudinal ribs.

14. A rear structure of a saddle-ride vehicle comprising:
    a rear fender, said rear fender including a first fender and a second fender operatively connected to each other;
    said first fender being formed with a hanging portion adapted to cover the rear and upside of a rear wheel;
    said second fender being adapted to cover the upside of the rear wheel;
    a fresh air inlet provided lateral to and in front of the rear wheel;
    wherein the first fender and the second fender are disposed to overlap each other in an anteroposterior direction with the second fender being disposed on the vehicle-widthwise inside of the first fender, and the second fender having anteroposteriorly and downwardly extending sidewalls at both vehicle-widthwise lateral end portions.

15. The rear structure of a saddle-ride vehicle according to claim 14, wherein a vehicle-widthwise and forward extending rib wall is installed on an opposite surface of the first fender to the rear wheel at a position below the second fender.

16. The rear structure of a saddle-ride vehicle according to claim 14, wherein a cross member connecting a pair of left and right seat rails together is provided, and the second fender is secured to the cross member.

17. The rear structure of a saddle-ride vehicle according to claim 14, wherein a lamp is installed on a rear surface of the first fender at a position to the rear of the second fender, and a harness connected to the lamp is disposed between the first fender and the second fender.

18. The rear structure of a saddle-ride vehicle according to claim 14, wherein a luggage box is disposed in front of the second fender, said luggage box including a bottom wall lower surface located to face the rear wheel with a predetermined gap being provided between a front end of the second fender and a bottom wall rear end of the luggage box.

19. The rear structure of a saddle-ride vehicle according to claim 14, wherein a shield wall is installed on a side where the fresh air inlet is disposed in a vehicle-width direction, and between the second fender and the fresh air inlet in the anteroposterior direction.

20. The rear structure of a saddle-ride vehicle according to claim 19, wherein the shield wall is formed with a slit.

* * * * *